US007703685B2

(12) United States Patent
Horn et al.

(10) Patent No.: US 7,703,685 B2
(45) Date of Patent: Apr. 27, 2010

(54) LABEL APPLICATION DEVICE

(75) Inventors: Klaus Horn, Wuppertal (DE); Stefan Schwiers, Dubai (AE); Victor S. Barczyk, Lone Tree, CO (US); Kumabayashi Tomoyuki, Tokyo (JP)

(73) Assignee: Kabushiki Kaisha Sato (JP)

( * ) Notice: Subject to any disclaimer, the term of this patent is extended or adjusted under 35 U.S.C. 154(b) by 1192 days.

(21) Appl. No.: 11/244,250

(22) Filed: Oct. 5, 2005

(65) Prior Publication Data

US 2006/0226214 A1 Oct. 12, 2006

Related U.S. Application Data

(60) Provisional application No. 60/669,475, filed on Apr. 8, 2005.

(51) Int. Cl.
*G06K 7/00* (2006.01)

(52) U.S. Cl. ...................................... 235/486; 235/492

(58) Field of Classification Search ......... 235/485–488, 235/490–493; 53/134.1, 134.2, 135.1
See application file for complete search history.

(56) References Cited

U.S. PATENT DOCUMENTS

| | | | | |
|---|---|---|---|---|
| 3,822,163 | A * | 7/1974 | Bilotti | 156/351 |
| 4,517,451 | A * | 5/1985 | Kokubo et al. | 235/379 |
| 5,870,880 | A * | 2/1999 | Romagnoli | 53/134.2 |
| 6,220,516 | B1 * | 4/2001 | Tuttle et al. | 235/492 |
| 6,407,669 | B1 | 6/2002 | Brown et al. | 340/572.1 |
| 2002/0189750 | A1 | 12/2002 | Bleckmann et al. | 156/176 |

OTHER PUBLICATIONS

Written Opinion of the International Searching Authority dated Sep. 11, 2007.

* cited by examiner

*Primary Examiner*—Kumiko C Koyama
(74) *Attorney, Agent, or Firm*—Ostrolenk Faber LLP

(57) ABSTRACT

For applying a label to an article, and with a RFID tag on the label also being separated from the article, and for minimizing the influence from the article on the tag, and for securing stable reading and writing of data, a label application device applies a label to which a RFID tag comprising an IC chip and communication antenna is fixed, to the article. A folding device folds a portion of the label having a tag-fixing area to which the RFID tag is fixed, such that the back side of the label is pushed to the surface side of the label so that the label portion protrudes to form an angle and is folded, and then applying the label to the article. A device acts on the label portion to form the fold.

22 Claims, 19 Drawing Sheets

(A) Setting of Operation Flag Setting by Operation Portion

2) Setting of Operation Flag Setting by External Interface

LABEL APPLICATION DEVICE

CROSS-REFERENCE TO RELATED APPLICATION

This application claims the benefit of the filing date of U.S. Provisional Patent Application No. 60/669,475 filed Apr. 8, 2005, the disclosure of which is hereby incorporated herein by reference.

BACKGROUND OF THE INVENTION

1. Field of the Invention

The present invention relates to a label application device for applying a label to an article, wherein the label is fixed with a so-called RFID tag having an IC chip therein for storing various information.

2. Description of the Related Art

In a recent widely used technology, an IC (integrated circuit) chip for storing various information and a RFID (Radio Frequency Identification) tag comprising a communication antenna connected to the IC chip are together fixed inside a label which may be applied to various articles, to provide wireless, non-contact automatic identification by means of the RFID tag.

FIG. 19 hereof shows a label L which is fixed with a RFID tag T. The label L comprises an outer display layer U and an inner adhesion layer B, at the back of the display layer U. The adhesion layer is fixed on the RFID tag T. The display layer U and the adhesion layer B are serially tacked on a strip-shaped backing paper D.

The RFID tag T is conventionally configured with an IC chip Ta and a communication antenna Tb and is protected by a film layer P which covers the whole.

A label application device applies the label L, to which the RFID tag T is fixed, to an article. A conventional label application device, for example, proposed previously by the present applicant/assignee hereof, is disclosed in Japanese Patent Application Laid-Open No. 2005-104521. This label application device conveys a label L, which is tacked on a backing paper D, and adheres the label L at a predetermined attachment position by means of an attachment plate after the label L is released from the backing paper D and the device applies the label L, which is then adhered by the attachment plate, to an article at a predetermined attachment position on the article.

Incidentally, with a UHF RFID tag T in a label L which has been applied by such a conventional label application device, if the material or content of an article to which the label L is applied may disturb the electromagnetic wave, in other words, for example, if the material or content of the article contains metal, water, or the like, although depending on the frequency, a problem may occur because the electromagnetic wave is absorbed into the article due to the influence of the metal or the liquid such as water in the article, or a reader/writer cannot read or write the information of the IC chip Ta due to a disturbance in the electromagnetic wave caused by diffuse reflection.

The present invention concerns the above described problems. An object of the present invention is to provide a label application device which affixes a label, having a portion thereof to which a RFID tag has been applied, to an article with the portion having the tag protruding from the label to form an angle to the direction of extension of the label, which angle separates the RFID tag from the article. The influence on the RFID tag from the article to which the RFID tag is applied can be reduced, whereby stable reading and writing of data can be secured.

SUMMARY OF THE INVENTION

A label application device of the present invention applies a label, to which a RFID tag has been applied, to an article. The label includes an IC chip and a communication antenna. The application device comprises label holding means for holding the exposed or upper surface side of the label, and folding and applying means for folding a portion of the label to which the RFID tag is fixed, such that the back side or under side of the label is pushed to the surface side at the tag fixing area, such that the portion of the label including the tag fixing area protrudes from the surface side of the label to form an angle, and then the label so formed is applied to an article.

According to the present invention, the folding and applying means causes the portion of the label to which the RFID tag is affixed to protrude to form an angle to the label such that when the label is applied to the article, the RFID tag may be separated from the article. Thus, if the material or content of the article to which the RFID tag has been applied is metal or a liquid such as water, the influence of the article on the tag can be reduced, whereby transmission of information to or from the tag can be performed more securely.

The folding and applying means comprises folding means for folding a portion of the label having the tag-fixing area to which the RFID tag of the label is fixed, such that the back side of the label is pushed to the surface side of the label causing the portion of the label to protrude to form an angle to the remainder of the label.

The label holding means comprises a pair of divided and separable bodies to which the label is temporarily adhered. The folding means can transfer either one of the divided bodies between two positions, namely a separation position and a joining position. This folds a portion of the label which is at the respective end faces of the divided bodies which face each other, and pushes the surfaces of one side face and another second side face of the label, which forms an apex portion between the one and the other side faces and defines bent portions by abutting the first and second side faces of the label against each other, thereby forming a folded portion of the label.

The label application device further comprises a press member which folds a portion of the label and presses the bent portion side of the second side face formed with the apex portion therebetween. The folding means can transfer the press member between two positions, a separation position and a joining position. The press member and the label holding means bend a portion of the label by pressing the bent portion of the one side face and the bent portion of the other side face in a direction in which the back faces of the one side face and the other side face of the label approach each other, thereby forming the folded portion.

By forming a simple configuration of the folding means, the folding action of the label L can be performed quickly, and a portion of the label having the tag-fixing area fixed with the RFID tag of the label can be folded such that the back face side of the label is pushed to the surface side of the label so that the label protrudes and forms an angle.

The folding and applying means comprises fold assisting means for assisting folding of a portion of the label such that the back side of the label is pushed to the surface side of the label to form an angle.

The fold assisting means may comprise an air blow nozzle which blows air onto the portion of the label from the back side thereof, and a portion of the label is folded toward the surface side thereof by the force of the blowing air.

Alternatively, the fold assisting means may comprise a suction nozzle which draws a portion of the label from the surface side thereof to fold the portion of the label toward the surface side thereof.

By configuring the fold assisting means using a cheap member, miniaturization and cost reduction may be achieved, and folding can be performed securely since folding is assisted such that a portion of the label fixed with the RFID tag is folded in the same direction.

The label application device comprises fold control means for driving the folding means or the fold assisting means and for controlling whether to fold a portion of the label such that the back side of the label is pushed to the surface side of the label so that the portion is folded to form an angle.

The label application device comprises setting means for setting whether to fold a portion of the label such that the back side of the label is pushed to the surface side of the label so that the portion is folded to form an angle, storage means for storing a set value which is set by the setting means, and judging means for judging the set value stored in the storage means. The fold control means drives the folding means or the fold assisting means to fold a portion of the label such that the back side of the label is pushed to the surface side of the label so that the portion is folded to form an angle, when the judging means judges the set value and judges that setting of folding a portion of the label such that the back side of the label is pushed to the surface side of same so that the portion is folded to form an angle.

The label application device further comprises an operation portion which sets the information related to operation of the label application device, and the setting means is set by means of the operation portion.

The label application device further comprises an external interface which performs wire communication or wireless communication with external equipment, and the setting means is set by means of received data which is received by the external interface from the external equipment.

The label application device further comprises a reader/writer which rewrites data to the IC chip of the RFID tag, and the setting means performs setting based on the presence or absence of a response obtained when the reader/writer performs communication with the IC chip.

The form of the label to be applied can be switched. The label can be applied to an article or it can be applied with the protruding portion of the label, to which the RFID tag is fixed, to form an angle by means of the fold control means. Thus, a label applying system can be established depending on whether the label is fixed with a RFID tag, or in accordance with an operation or use application.

The folding and applying means may comprise transfer means for transferring between an attachment position at which the label holding means attaches the label, and an application position at which the label is applied to the article.

The label holding means may be the attachment plate.

With the label application device of the present invention, the folding and applying means enables a portion of the label on which the RFID tag is fixed to protrude to form an angle, so that when the label is applied to an article, the RFID tag can be separated from the article. Thus, when the material or content of the article to which the RFID tag is applied is metal or liquid, the influence of the metal or liquid can be reduced, whereby transmission of information can be performed securely.

Other features and advantages of the present invention will become apparent from the following description of the invention which refers to the accompanying drawings.

DESCRIPTION OF THE PREFERRED EMBODIMENTS

Hereinafter, the label application device according to embodiments of the present invention is described in detail based on the attached figures.

FIG. 1 through FIG. 15 are used to explain the label application device according to the embodiments of the present invention, and a label which is the object of the label application device. FIG. 4, FIG. 15, and FIG. 16 through FIG. 18 show an example of a label L which is the object of the present label application device.

Figure 16A:
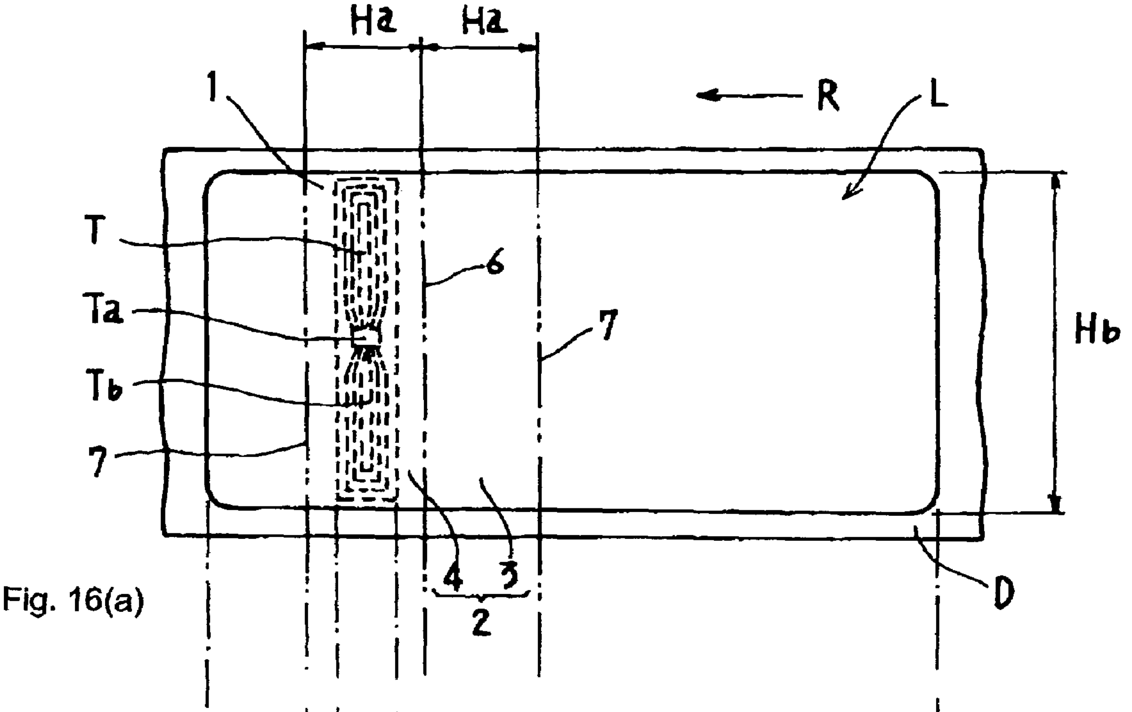
FIG. 16 shows an example of a label which is the object of the label application device of the present invention.
Figure 16B:
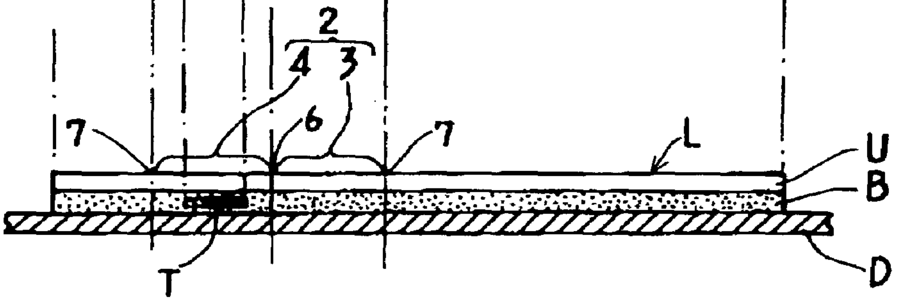
Figure 16C:
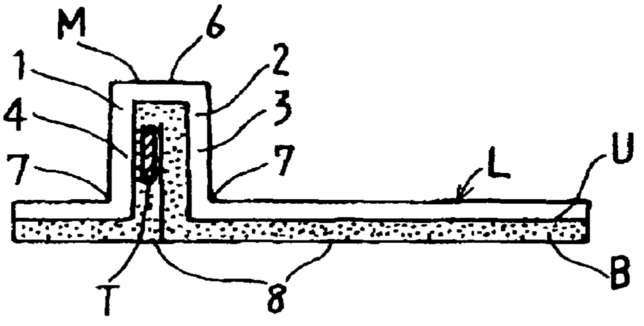
Figure 17A:
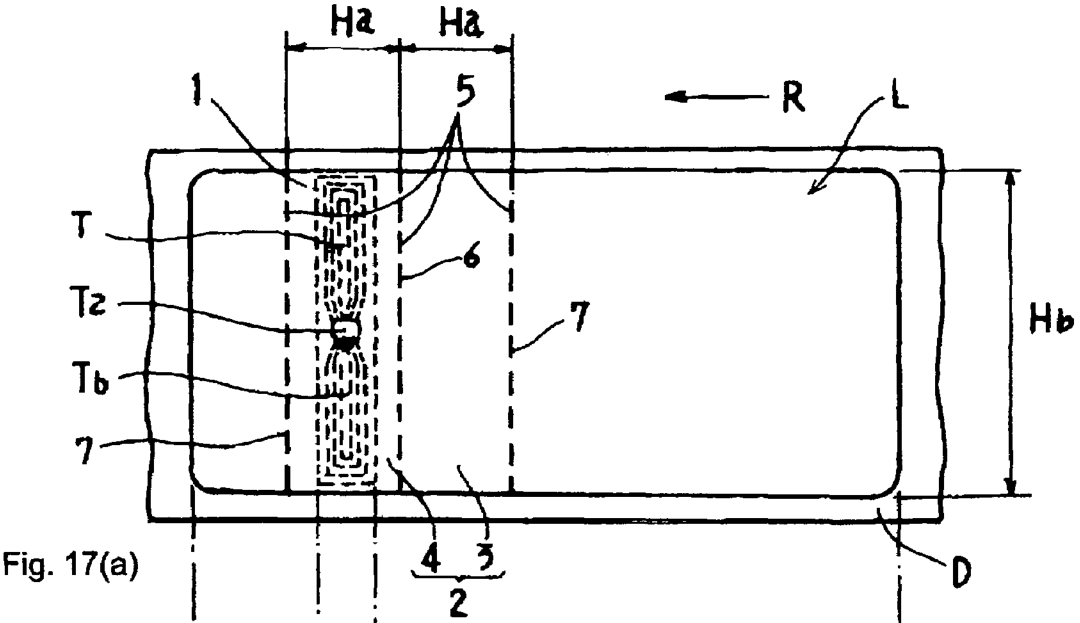
FIG. 17 shows an example of another label which is the object of the label application device of the present invention.
Figure 17B:
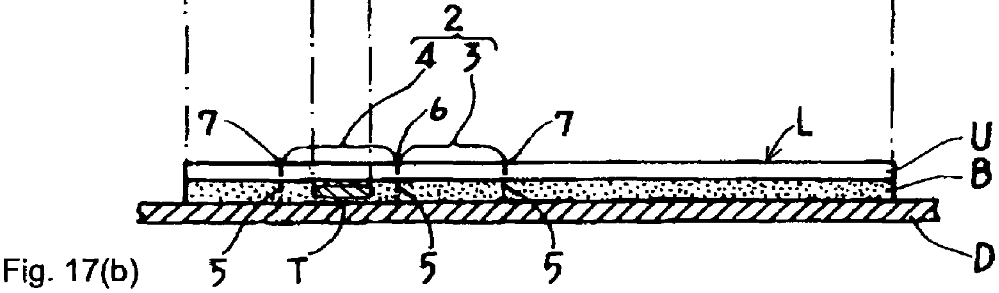
Figure 17C:
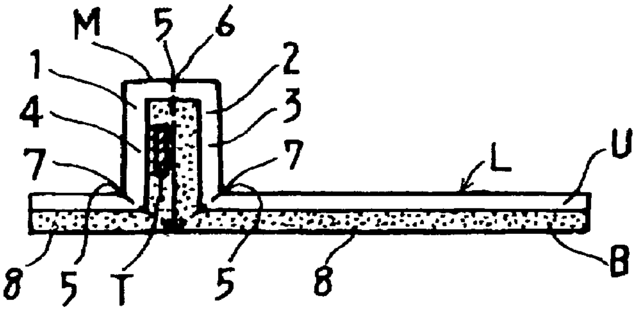
Figure 18A:
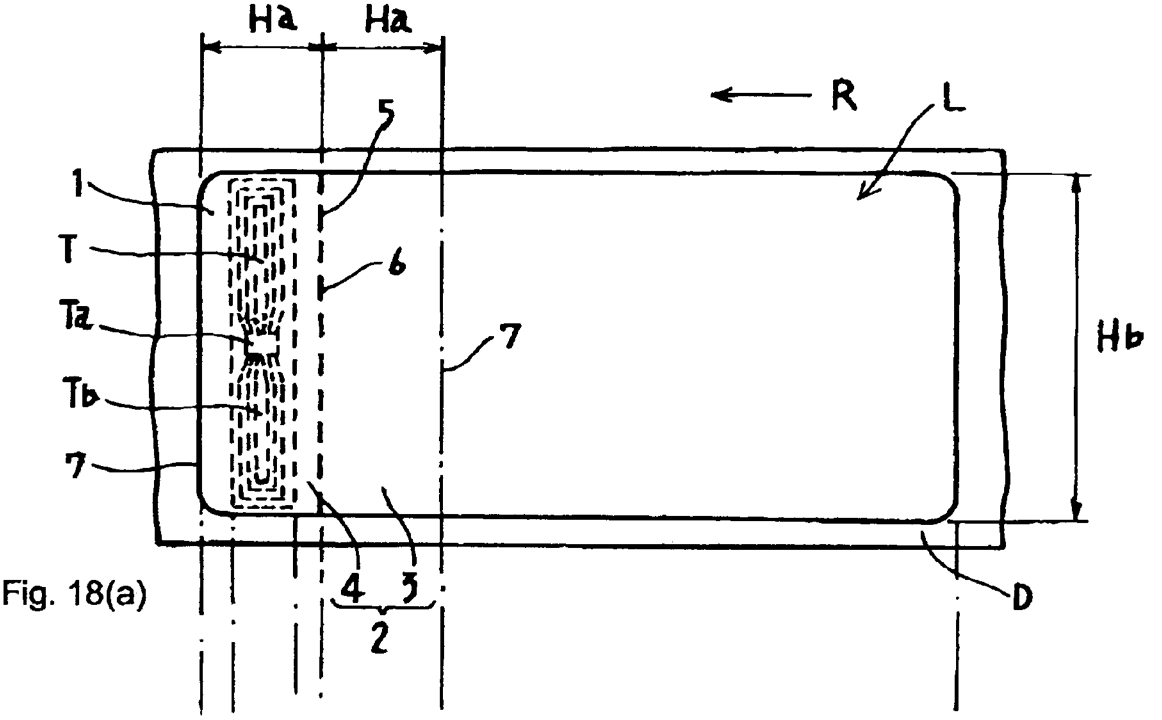
FIG. 18 shows an example of yet another label which is the object of the label application device of the present invention.
Figure 18B:
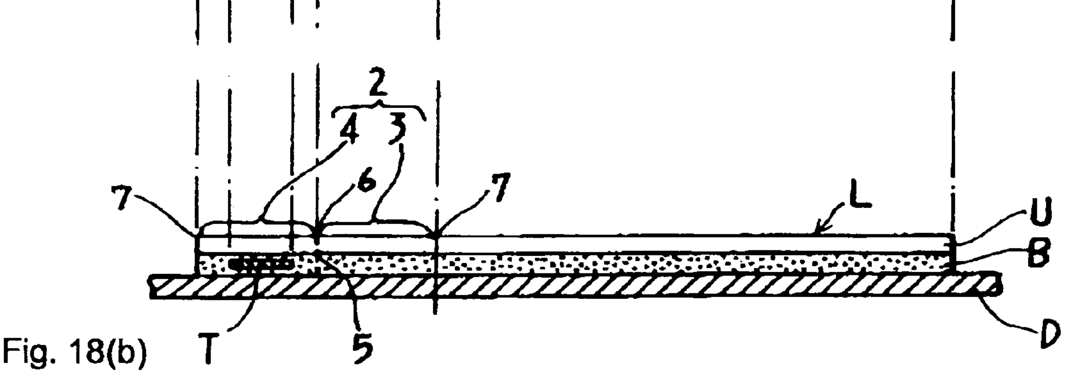
Figure 18C:
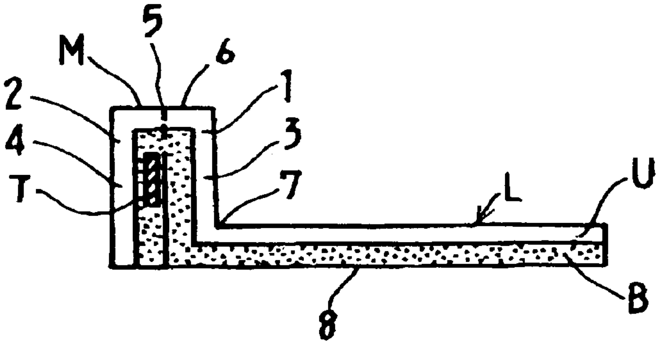

A tag-fixing area 1, on which a RFID tag T of a label L is fixed, is shown in FIG. 16 through FIG. 18. It is a rectangular area having a predetermined horizontal width Ha in a conveyance direction R of a backing paper layer D, and a predetermined transverse width Hb in a direction perpendicular to the conveyance direction R of the backing paper D and extends between a pair of sides of the label L, which face each other.

In its state of being applied to an article W, a portion 2 of the label L having the tag-fixing area 1, to which the RFID tag T is fixed, is folded such that the back face side (adhesion layer B side) of the label is pushed to the surface side (display layer U side) of the label so that the portion is folded and protrudes to form an angle, thereby forming a folded portion M having one side face 3 and another side face 4 which have respective bent portions 7 formed with an apex portion 6 therebetween. Moreover, the tag-fixing area 1 has either one of the side faces 3 and 4 which are formed with the apex portion 6 of the portion 2 of the label L therebetween. The portion 2 of the label L protrudes to form an angle (the second side face 4 in the Figure). The one side face 3 is a rectangular area having a size corresponding to that of the tag-fixing area 1, has the predetermined horizontal width Ha in the conveyance direction R of the backing paper D, and the predetermined transverse width Hb in a direction perpendicular to the conveyance direction R of the backing paper D and which extends between a pair of sides of the label L, which face each other. An application face 8 for applying the label L protrudes to form an angle to the article W.

In a label L shown in FIG. 16, the portion 2 of the label L, having the tag-fixing area 1 to which the RFID tag T of the label L is fixed, is formed in the position, which is located more to the front side of the label L from the center of the label L in the conveyance direction R. The portion 2 of the label L is folded such that the back side of the label is pushed to the surface side of the label which causes the portion to be folded and to protrude to form an angle to the rest of the label and its direction of extension, thereby forming the folded portion M. In that state, the application faces 8 of the label L are formed on both sides of the portion 2 of the label L along the conveyance direction.

A label L shown in FIG. 17 is substantially same as the label L shown in FIG. 16, except that in a portion 2 of this label L, which is protrudes to form an angle to the rest of the label, perforations 5 are formed on an apex portion 6 and in the bent portions 7 which are folded to form an angle. The presence of the perforations 5 enables folding to be performed easily.

In the label L shown in FIG. 18, the portion 2 of the label L having the tag-fixing area 1, on which with the RFID tag T of the label L is fixed, is formed at an end portion of the label L. In the portion 2 of the label L which protrudes to form an angle to the rest of the label, a perforation 5 is formed on the apex portion 6 which is folded to form the angle. Further, the portion 2 of the label L is folded such that the back face side of the label is pushed to the surface side of the label so that the portion is folded and protrudes to form the angle. The application face 8 of the label L is formed on one side of the portion 2 of the label L.

Furthermore, in the portion 2 of the label L having an angle shown in FIG. 18, a perforation may be formed on the bent portions 7.

The RFID tag T of the labels L shown in FIG. 16 through FIG. 18 is described with the RFID tag T fixed inside the adhesion layer B. But this placement is not required. Thus, the RFID tag T may be held between the display layer U at the surface side and the adhesion layer B or may be on a lower surface of the adhesion layer B (backing paper D side). Further, even if the RFID tag T is fixed on the surface of the display layer U (other side of the surface with which the adhesion layer B contacts), the same effect is achieved.

By covering the tag-fixing area 1 with the display layer U and adhesion layer B of the label L to form a double structure, the strength of this part can be increased, preventing the RFID tag T from being easily damaged. For this reason, it is preferred that the RFID tag T be fixed inside the one side face 3 or the other side face 4 (the adhesion layer B side) of the portion 2 of the label L to which the RFID tag T is fixed.

FIG. 1 through FIG. 3, and FIG. 5 show a label application device according to a first embodiment of the present invention. In the label L, which is the object of the label application device of the first embodiment, the portion 2 of the label L having the tag-fixing area 1 is formed in an intermediate portion or generally a middle portion of the label L, as shown in FIG. 4, FIG. 16 and FIG. 17.

Figure 3:
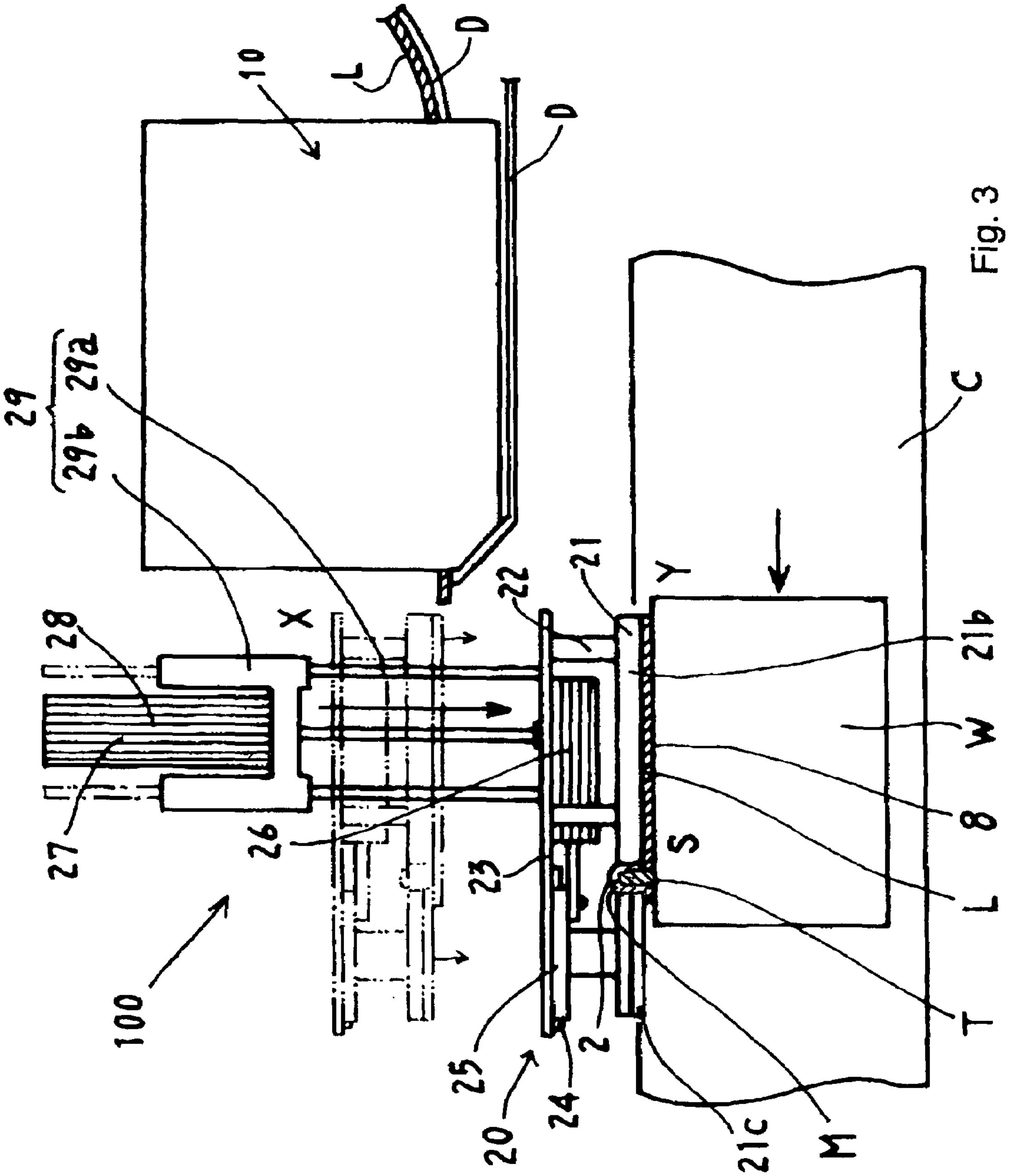
FIG. 3 is a plan view showing the label application device of the first embodiment of the present invention, along with its operation.
Figure 4:
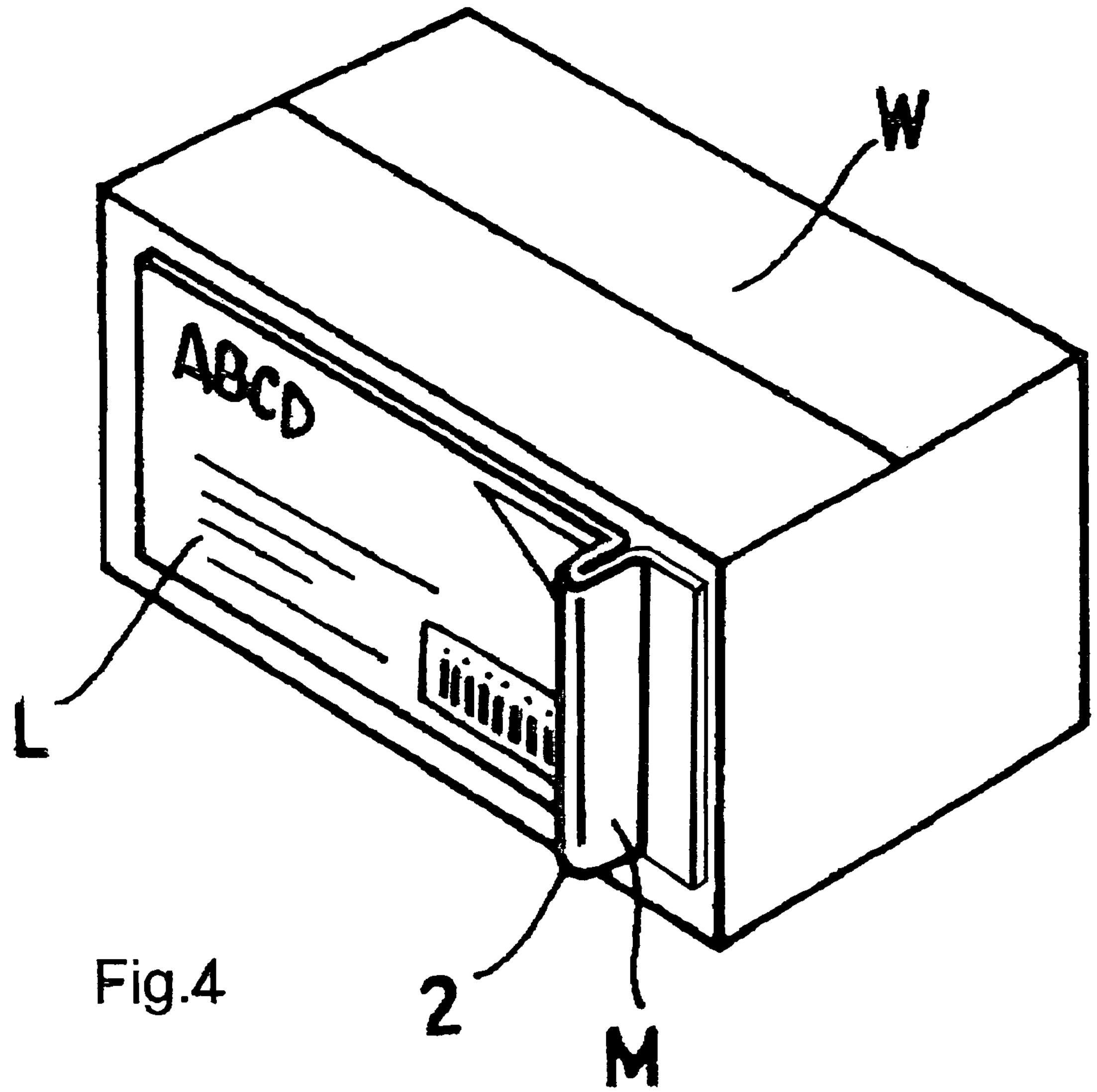
FIG. 4 is a perspective view showing a state of a label which is applied to an article by the label application device related to the first embodiment of the present invention.

A label application device 100 according to a first embodiment in FIGS. 2 and 3 is operable to apply the label L to an article W which is conveyed along a predetermined conveyance direction from a conveyer C. The label application device 100 comprises label conveying means 10 and label folding and applying means 20.

Figure 19:
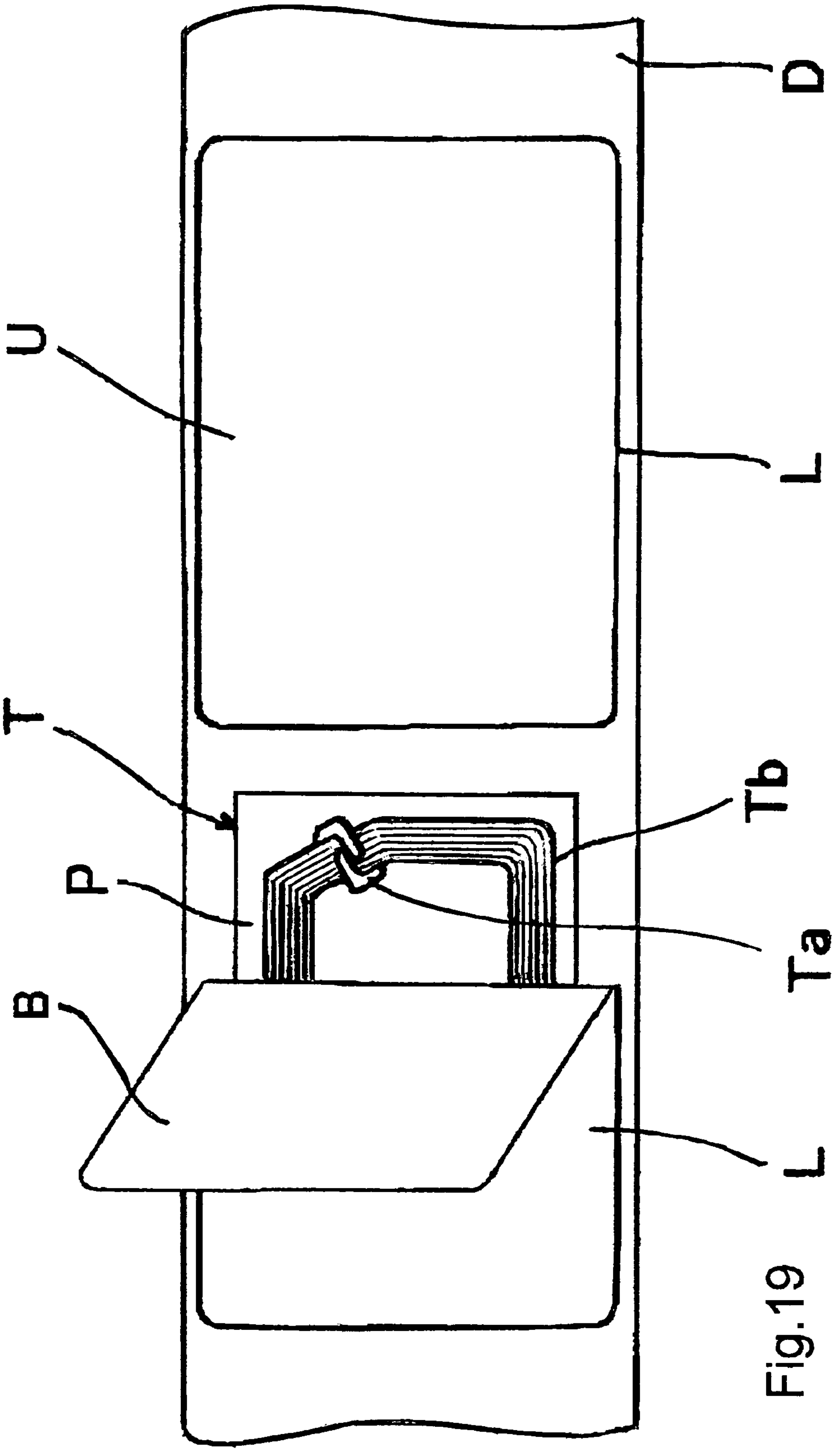
FIG. 19 shows a general example of a label fixed with a RFID tag.

The label conveying means 10 includes a release plate 11 operable for releasing the label L from the backing paper D, a sensor 12 for detecting that the label L has been conveyed to a predetermined position, and a reader/writer 13 for rewriting data to the IC chip Ta (FIG. 19) of the RFID tag T. The backing paper D tacked with the label L, which is supplied from a roller, not shown, is conveyed, and then folded back by the release plate 11, which separates the label L from the backing paper. The folded backing paper D is wound on a reel which is not shown.

Moreover, during conveying of the label L, the sensor 12 measures the timing for operating the folding and applying means 20, based on the detection of the label. L, and the reader/writer 13 rewrites data to the IC chip Ta of the RFID tag T, and carries out verification by writing or reading the information.

The folding and applying means 20 comprises an attachment plate 21 (label holding means), which is to be attached to the bottom side of the label L such that the portion 2 of the label L, which has the tag-fixing area 1 to which the RFID tag T of the label L is fixed, is released from the release plate 11. The portion 2 can be caused to protrude by being pushed at its back face or under side toward its front surface side. The attachment plate 21 has a plurality of pores 21_a_ through which air is drawn for attaching the upper surface of the label L to the plate 21.

The attachment plate 21 is configured with a pair of divided or separated bodies 21_b_, 21_c_, which are moved together and separated along a line perpendicular to the conveyance direction R of the label L. The rearward or upstream divided body 21_b_ is suspended from and supported by the base 23 by a supporting member 22.

The forward or downstream divided body 21_c_, on the other hand, is suspended from and supported by the base 23 by a slider 25 which slides on a rail 24 along the conveyance direction R of the label L. The body 21$c$ is slidable between two positions, namely a joining position S (FIG. 2($d$)) in which a rear end portion, in the conveyance direction R, of the label L on the forward divided body 21$c$ is joined with a front end portion, in the conveyance direction R, of the label L which is held on the rearward divided body 21$b$, and a separation position V (FIGS. 2($b$) and ($c$) in which the divided body 21$c$ is separated from the divided body 21$b$. In the separation position V, there is a space e between the divided bodies 21$b$ and 21$c$ into which the folded portion 2 of the label L can enter. The folded portion is caused to protrude by its back side moving toward its surface side. The divided bodies 21$b$ and 21$c$ respectively attach and hold their respective end portions of the label L along the conveyance direction R.

Moreover, the forward divided body 21$c$ is driven by an air cylinder device 26 which is a part of the folding means and the body 21$c$ places the label L in the joining position S at the time of moving backward (FIG. 2$a$), and in the separation position V at the time of moving forward (FIG. 2$b$). The air cylinder device 26 comprises a piston on which the slider 25 of the divided body 21$c$ is fitted, and a cylinder which receives that piston and is fixed to the base 23.

Furthermore, the folding and applying means 20 comprises transfer means 27 for transferring the attachment plate 21 between two positions, an attachment position X (FIG. 2$a$) at which the label L is held at and released by the attachment plate 21, and an application position Y (FIG. 3) at which the attached label L is moved down and applied to the article W.

The transfer means 27 comprises a second air cylinder device 28 which comprises a piston on which the base 23 is fitted and a cylinder on a machine board (not shown) side. A guide 29, comprising a guide shaft 29$a$ and a guide tube 29$b$ into which the guide shaft 29$a$ is slidably inserted, guide transfer of the base 23.

Further, the folding and applying means 20 comprises fold assisting means 30 (FIGS. 1 and 2$c$) for assisting the portion 2 of the label L which is to protrude by pushing at the back side of the portion 2 toward its surface side so that the label portion enters the space between the divided body 21$b$ and 21$c$.

One embodiment of the fold assisting means 30 comprises an air blow nozzle 31 which blows air from the back side (adhesion layer B side) of the portion 2 of the label L, and folds the portion 2 of the label L toward the surface side thereof to form an angle between the label portion 2 and the rest of the label or the direction of extension of the label by the blowing force of the air. The air blow nozzle 31 and air cylinder device 26 (folding means) fold the portion 2 of the label L to form the folded portion M (FIGS. 1 and 2$c$) which includes one side face 3 and another side face 4, having respective bent portions 7 and the apex portion 6 therebetween (FIG. 1), whereby folding of the portion can be performed securely.

Figure 5:
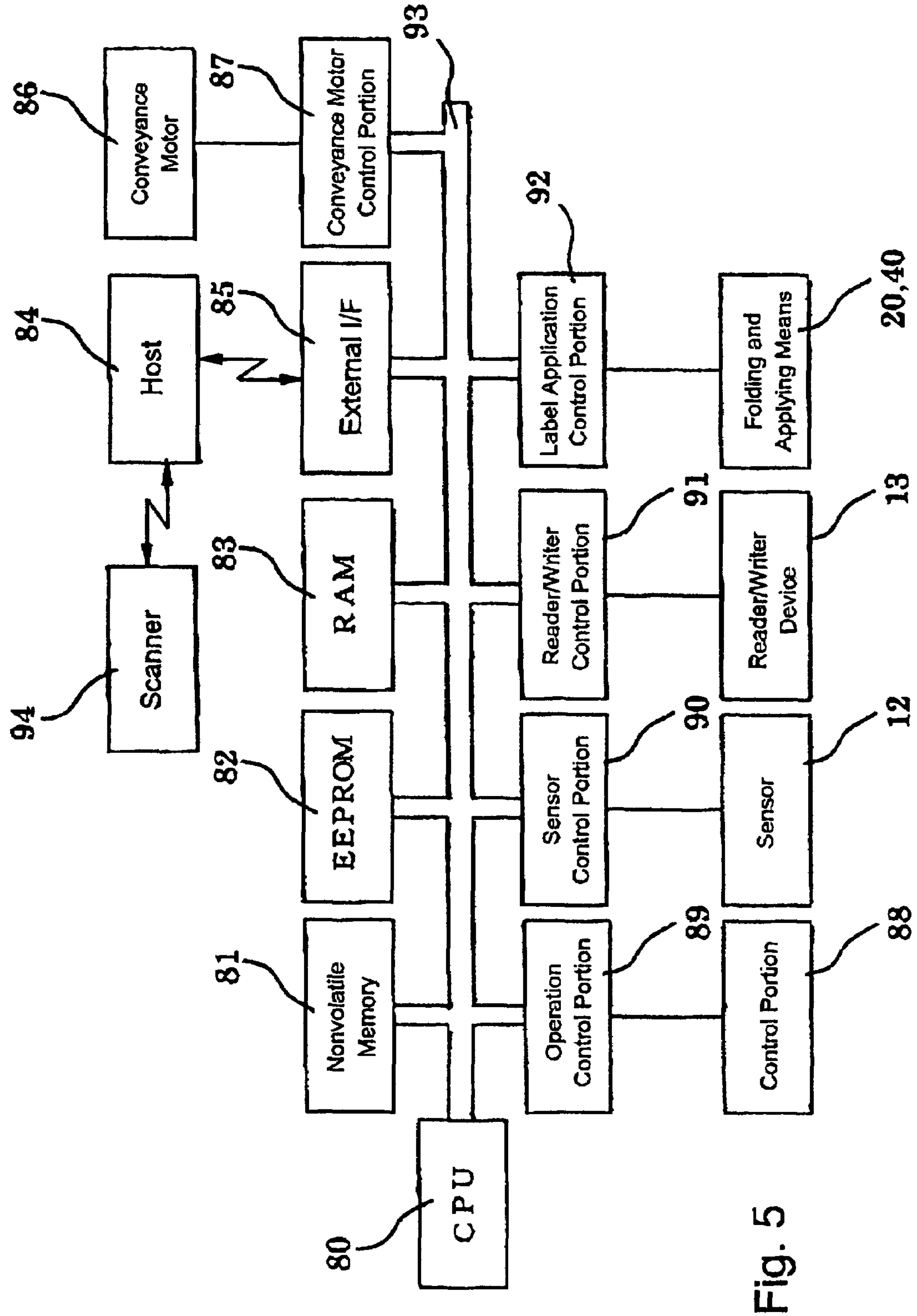
FIG. 5 is a configuration diagram of a circuit of the label application device related to the first embodiment of the present invention.

FIG. 5 is a schematic diagram of a circuit of the label application device related to the embodiments.

The label application device 100 uses a system bus 93 to control a CPU 80 which controls the label application device 100, a nonvolatile memory 81 comprised of a ROM for storing programs of various control portions, flash memory and the like, a EEPROM 82 (Electrically Erasable Programmable Read-Only Memory) which is rewritable and holds settings of various operations of the label application device, a RAM 83 which is used as a work area of the CPU 80, an external interface 85 which performs wire communication or wireless communication with external equipment (host 84), a conveyance motor control portion 87 which controls a conveyance motor 86 conveying the backing paper D, an operation control portion 89 which controls an operation portion 88 which sets the information related to the operation of the label application device 100 and comprises various buttons and a display panel, a sensor control portion 90 which controls the sensor 12 detecting the label L, a reader/writer control portion 91 which controls the reader/writer 13 rewriting data to the IC chip Ta of the RFID tag T, and a label application control portion 92 (fold control means) which controls the folding and applying means 20. A scanner 94 which reads a bar code fixed in the article W is connected to the host 84.

The EEPROM 82 is provided with an operation flag region for judging whether or not the label application control portion 92 operates the air cylinder device 26 (folding means) and fold assisting means 30. Setting of this operation flag region is performed by carrying out setting from the operation portion 88 (A), setting by means of a command received by the external interface 85 (B), or setting performed by the reader/writer 13 to detect whether the label L is a normal label to which a label is not fixed with the RFID tag T or a label L has the RFID tag T(C) fixed to it.

In addition, the label application control portion 92 is configured such that if "ON" (1) is set in the operation flag region of the EEPROM 82, the air cylinder device 26 (folding means) and the fold assisting means 30 are operated at the time of application operation of the label L, and if "OFF" (0) is set, the air cylinder device 26 (folding means) and the fold assisting means 30 are controlled so as not to be operated.

Therefore, as described hereinafter, the label L is applied by the label application device 100 according to the first embodiment.

The following explains a situation in which setting of an operation flag is performed by carrying out setting from the operation portion 88 (A) in the operation flag region of the EEPROM 82. In this setting, for example, articles W having the same content are continuously conveyed by the conveyer C. When the label which is loaded on the label application device 100 at the change of the article W is a normal label, the operation flag is set to "OFF" (0), and when the label L to which the RFID tag T is affixed is loaded, the operation flag is set to "ON" (1).

FIG. 1, FIG. 2, FIG. 3 and FIG. 6 are first used to explain operation of the label application device 100 when the operation flag of the operation flag region of the EEPROM 82 is set to "ON" (1) by the operation portion 88.

Figure 6:
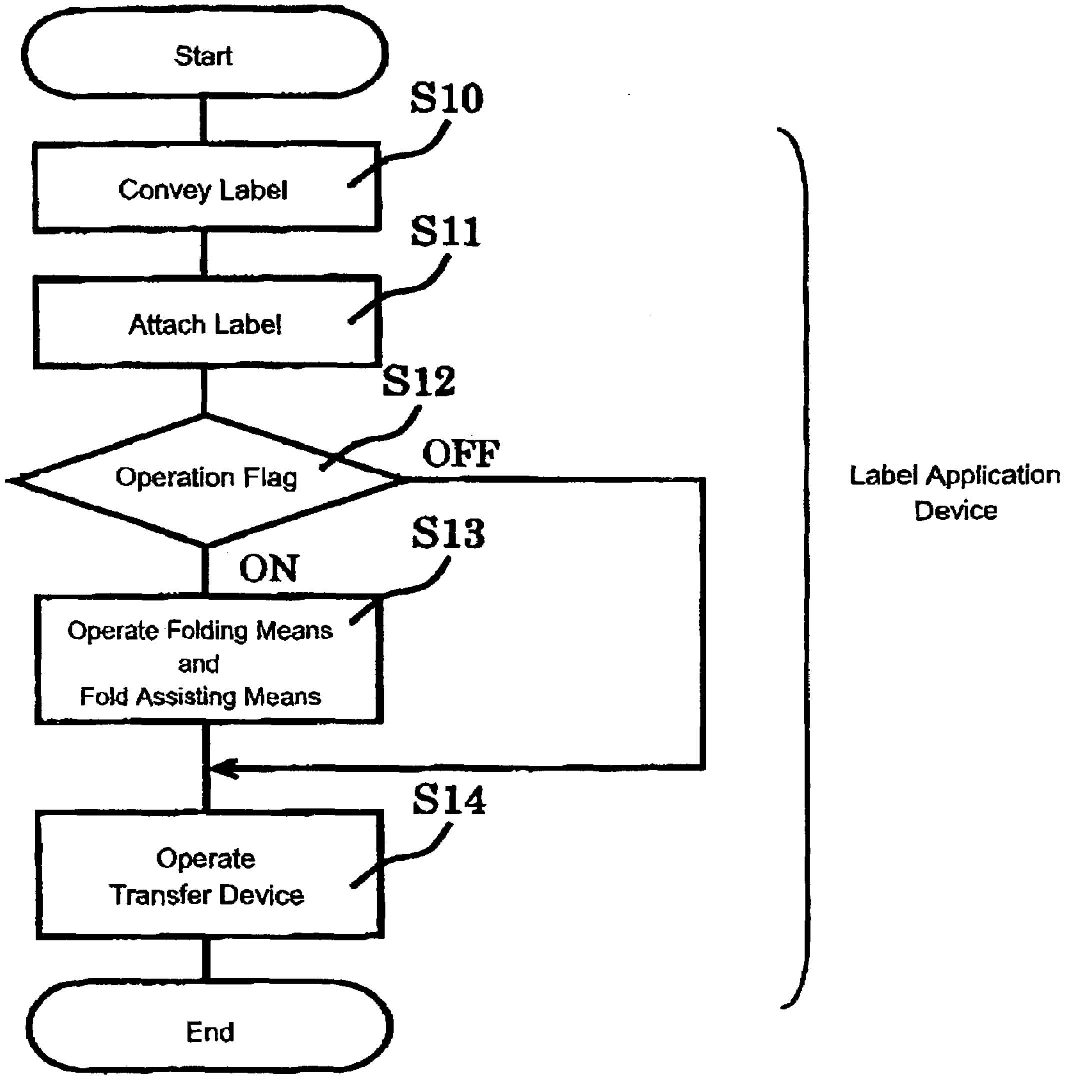
FIG. 6 is a flow chart showing one mode of operation of the label application device related to the first embodiment of the present invention.

As shown in FIG. 2($a$), the label L is conveyed by the label conveying means 10 (FIG. 6 (S10)), and the sensor 12 measures the timing when the label application control portion 92 operates the folding and applying means 20, in accordance with detection of the label L. Next, when the backing paper D is folded by the release plate 11 and the label L is released, the attachment plate 21 attaches the label L in the attachment position X (FIG. 6 (S11)).

Since "ON" (1) is set in the operation flag region of the EEPROM 82 (FIG. 6 (S12 ON)), the label application control portion 92 operates the air cylinder device 26 (folding means) and the fold assisting means 30 at the time of application operation of the label L (FIG. 6, (S13)).

Specifically, as shown in FIG. 2($b$), the label application control portion 92 operates the air cylinder device 26 to position the divided body 21$c$ to the separation position V. This creates the space e between the divided body 21$b$ and the divided body 21$c$ into which the portion 2 of the label L, which is caused to protrude by being pushed at its back face side (adhesion layer B side) toward its surface side (display layer U side), may enter.

Figure 1:
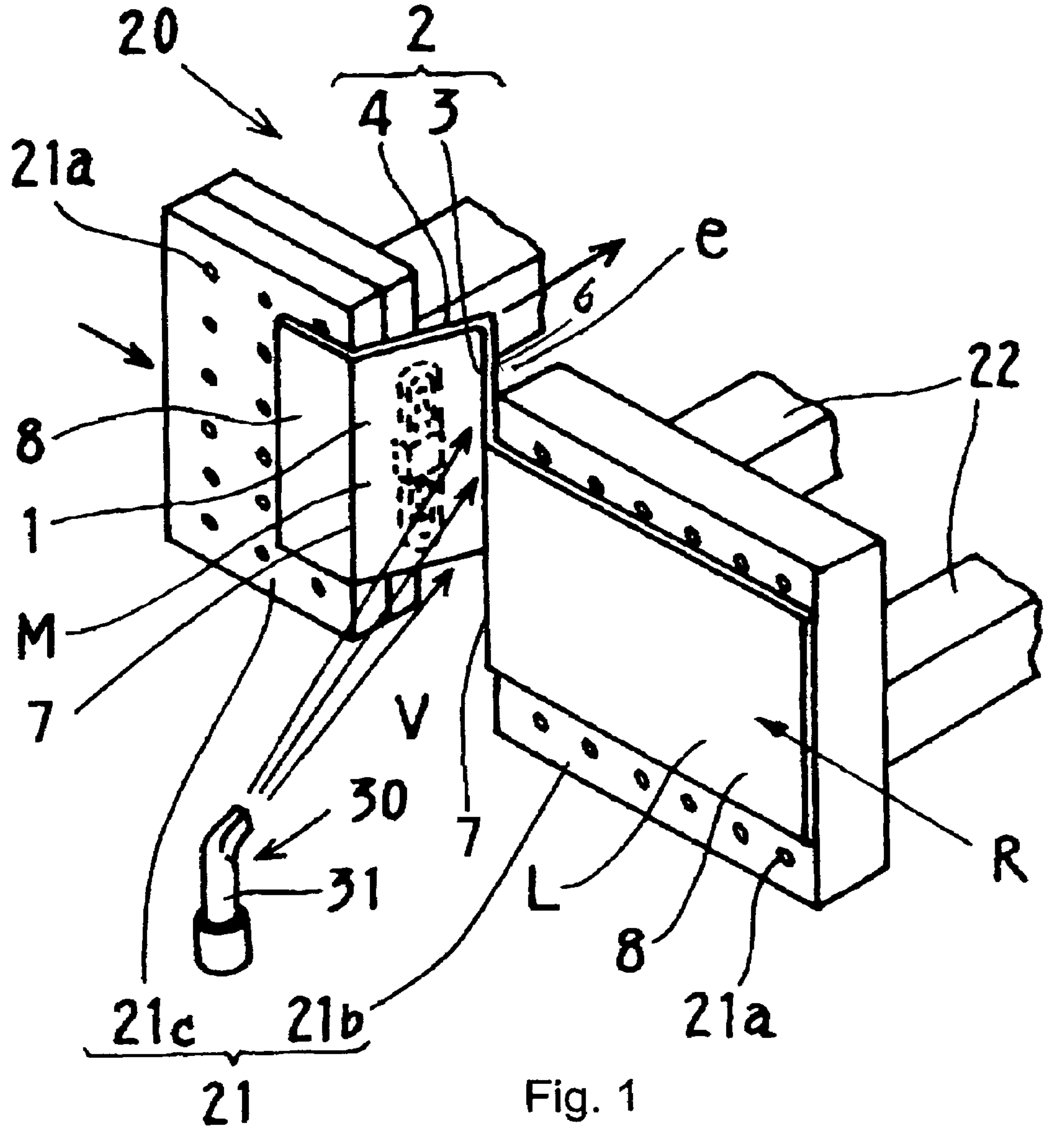
FIG. 1 is a perspective view of a substantial part, which shows a label application device related to a first embodiment of the present invention.
Figure 2A:
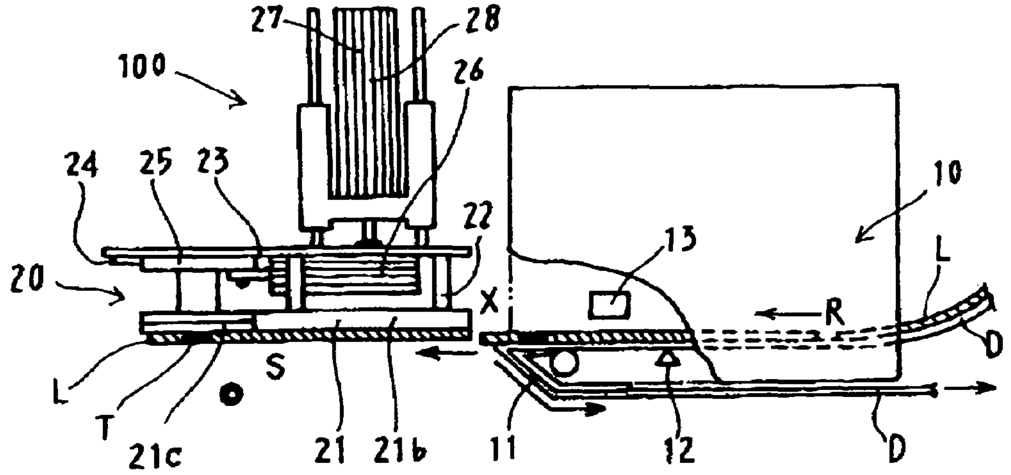
FIG. 2 is a plan view showing the label application device of the first embodiment of the present invention, along with its operation.
Figure 2B:
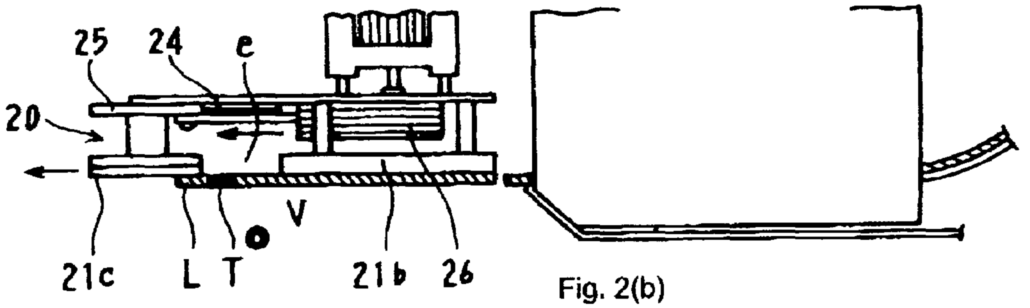
Figure 2C:
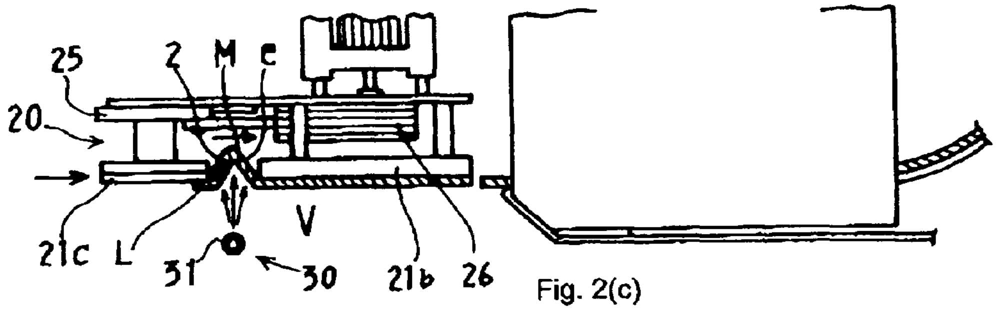
Figure 2D:
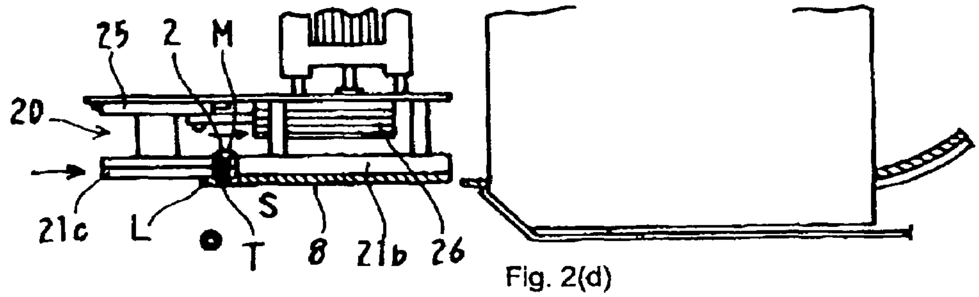

Next, the label application control portion 92 operates the air cylinder device 26, as shown in FIG. 1 and FIG. 2($c$), to transfer the divided body 21*c* from the separation position V to the joining position S. At this time, the label application control portion 92 operates the air blow nozzle 31 to blow air toward the back side (adhesion layer B side) of the portion 2 of the label L which has the tag-fixing area 1 on which the RFID tag T of the label L is fixed. Accordingly, while the divided body 21*b* and the divided body 21*c* respectively attach and hold the both end portions of the label L in the conveyance direction R, the bent portion 7 of the one side face 3 and the bent portion 7 of the other side face 4 are pressed in the direction in which the back sides of the one side face 3 and other side face 4 approach each other, whereby the folded portion M is formed. In this case, the surface side (display layer U side) of the portion 2 of the label L is pressed by the blowing force of the air coming from the air blow nozzle 31, so that the portion 2 of the label L is gradually folded to form an angle securely.

As shown in FIG. 2(*d*), once the divided body 21*c* is transferred from the separation position V to the joining position S, the end faces of the divided body 21*b* and the divided body 21*c* that face each other are abutted respectively against the surfaces (display layer U) of the one side face 3 and the other side face 4 which are in the portion 2 of the label L, to push these surfaces, and the back faces of the one side face 3 and the other side face 4 are joined with each other, whereby the folded portion M is formed.

Thereafter, the label application control portion 92 operates the air cylinder device 28 of the transfer means 27 as shown in FIG. 3, to transfer the attachment plate 21 from the attachment position X to the application position Y (FIG. 6 (S14)). Accordingly the attached label L is applied to the article W. In this case, the application face 8 of the label L is formed on both sides of the folded portion M, which is the portion 2 of the label L that protrudes to form an angle with respect to the rest of the label, and the label is thus pressed to the article W by the divided body 21*b* and the divided body 21*c*, whereby the label L is securely applied to the article W. After applying the label, the attachment plate 21 returns to the attachment position X in FIG. 2(*a*).

The situation of applying a normal label, to which an RFID tag is not fixed, is explained next. In this case, the operation flag of the operation flag region of the EEPROM 82 is set to “OFF” (0) in the operation portion 88. To explain this case by using the flow chart shown in FIG. 6, as shown in FIG. 2(*a*), the label L is conveyed by the label conveying means 10 (FIG. 6 (S10)), and the sensor 12 measures the timing when the label application control portion 92 operates the folding and applying means 20, in accordance with detection of the label L. Next, when the backing paper D is folded by the release plate 11 and the label L is released, the attachment plate 21 attaches the label L in the attachment position X (FIG. 6 (S11)).

Since “OFF” (0) is set in the operation flag region of the EEPROM 82 (FIG. 6 (S12 OFF)), the label application control portion 92 operates the air cylinder device 28 of the transfer means 27 without operating the air cylinder device 26 (folding means) and the fold assisting means 30, and transfers the attachment plate 21 from the attachment position X to the application position Y (FIG. 6 (S14)).

Consequently, the normal label which is attached to the attachment plate is applied flat and unfolded to the article W. In this manner, by carrying out the setting from the operation portion 88 (A), the present invention can be easily introduced to a small system in which simple sorting of a small number of types of articles is performed.

Figure 7:
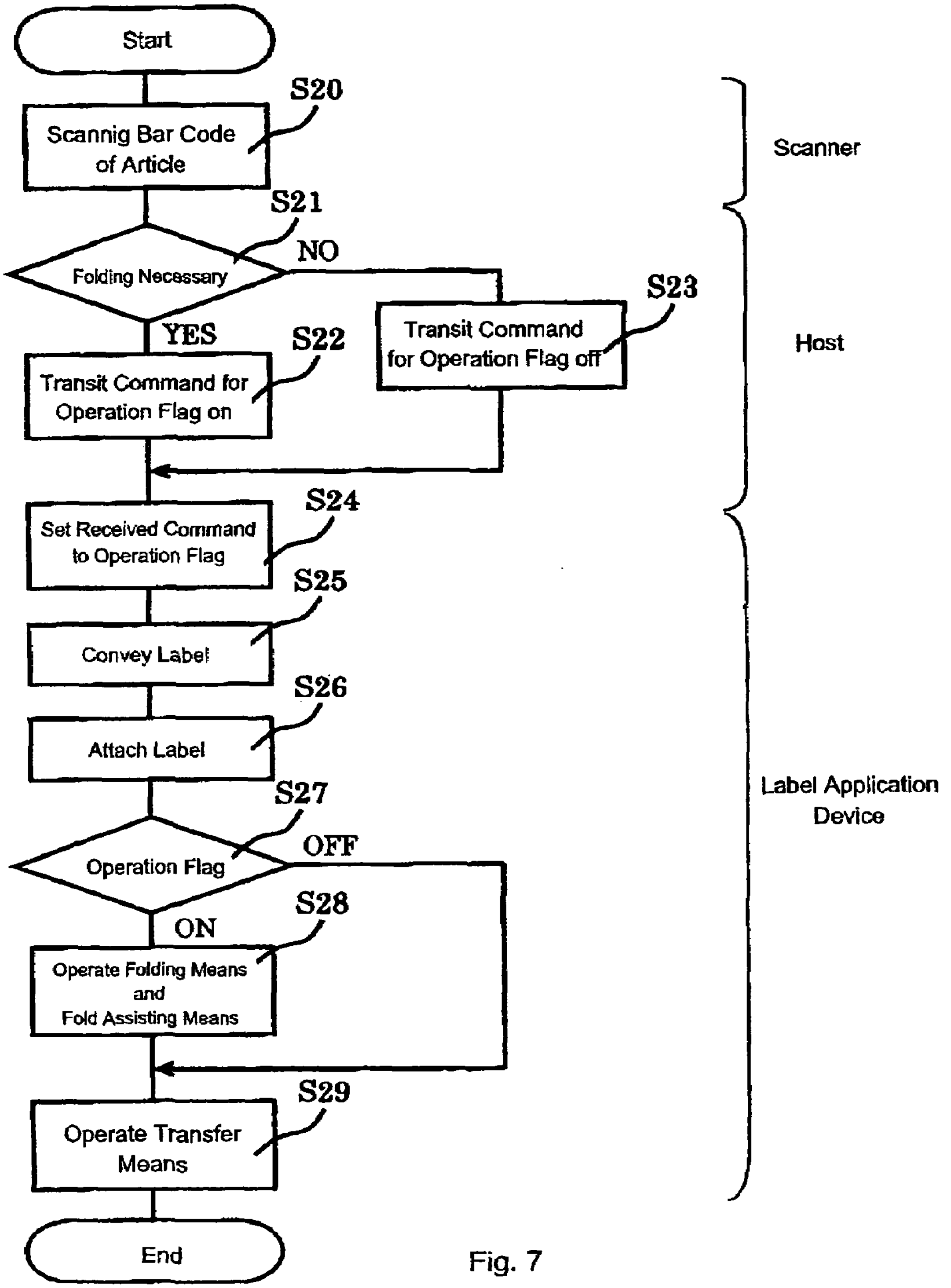
FIG. 7 is a flow chart showing another mode of operation of the label application device related to the first embodiment of the present invention.

Next, the flow chart shown in FIG. 7 explains the situation in which setting of the operation flag is performed by setting using a command received by the external interface 85 (B). This setting is such that, for example, in the label application device where the label L is fixed with the RFID tag T and the label is loaded, when the varying articles W having different contents therein are conveyed by the conveyer C, the label L to which the RFID tag T is fixed is applied flat according to the type of the article W (operation flag OFF), or according to a bar code into which an instruction is written regarding whether or not to apply the label L to article W after folding it to form an angle (operation flag ON) so that the label L is applied according to the instruction of the bar code.

As shown in FIG. 7, the scanner 94 first reads the bar code on the article W (S12), the host 84 judges whether the content of the bar code read by the scanner 94 indicates that the label L is to be applied after folding it to form an angle (operation flag ON), or that the label L is to be applied flat (operation flag OFF) (S21), and transmits a command for either one of these contents (S22, S23). The label application device 100 sets the operation flag of the operation flag region of the EEPROM 82 to “ON” (1) or “OFF” (0), according to the received command (S24).

Then, the label L is conveyed by the label conveying means 10 (S25), and when the backing paper D is folded by the release plate 11 and the label L is released, the attachment plate 21 attaches the label L in the attachment position X (S26). Next, when the operation flag of the operation flag region of the EEPROM 82 is “ON” (1) (S27 ON), the label application control portion 92 operates the air cylinder device 26 (folding means) and the fold assisting means 30 (S28). Thereafter, the label application control portion 92 operates the transfer means 27 (S29), and the label L is folded to form an angle and then is applied to the article W.

When “OFF” (0) is set in the operation flag region of the EEPROM 82 (S27 OFF), on the other hand, the label application control portion 92 operates the air cylinder device 28 of the transfer means 27 without operating the air cylinder device 26 (folding means) or the fold assisting means 30, and transfers the attachment plate 21 from the attachment position X to the application position Y (S29). Accordingly, the normal label which is attached to the attachment plate is applied flat to the article W.

According to this setting by the command received by the external interface 85 (B), it becomes easy to change the form of the label L to which the RFID tag T is affixed (whether to apply the label flat or to apply the label after folding it to form an angle), and the label L is applied according to the type or content of the article W.

The above description explains that the scanner 94 reads the bar code on the article W, and the host 84 judges whether the content of the bar code read by the scanner 94 indicates that the label L is applied after folding it to form an angle, or that the label L is applied flat, and transmits a command for either one of these contents. However, it should be noted that the scanner may be configured as external equipment such that the label application device 100 receives, via the external interface 85, the bar code data read by the scanner, and that the label application control portion 92 operates the air cylinder 26 (folding means) and the fold assisting means 30 in accordance with the content of the bar code read by the scanner.

Figure 8:
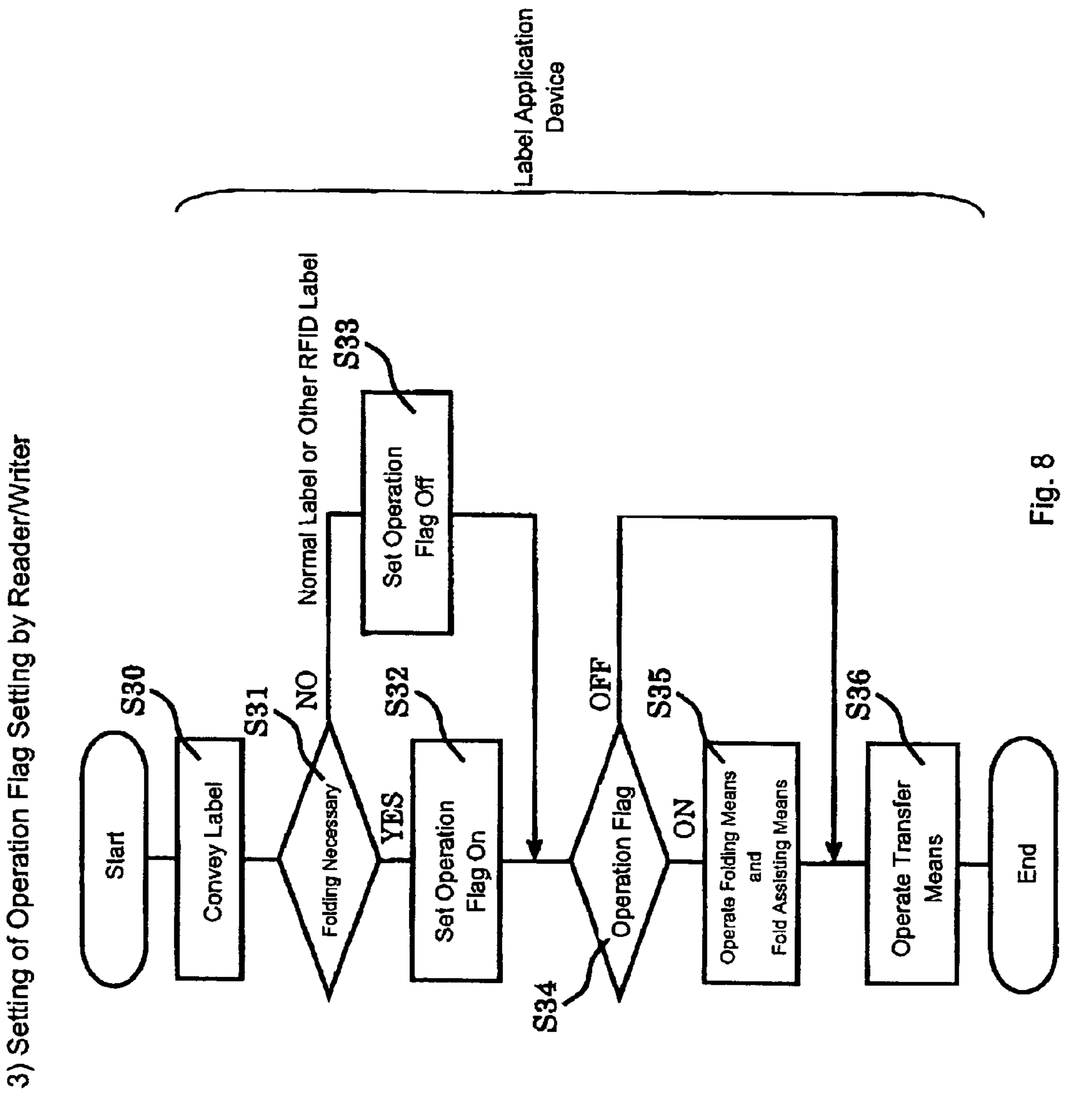
FIG. 8 is a flow chart showing yet another mode of operation of the label application device related to the first embodiment of the present invention.

Next, the flow chart shown in FIG. 8 explains the situation in which the setting of the operation flag is a performed by detecting, by means of the reader/writer 13, whether the label is a normal label to which no RFID tag T is fixed or a label L to which the RFID tag T (c) is fixed. This setting is such that, for example, the reader/writer 13 determines the type of the label loaded on the label application device 100 at the time of conveyance, and the operation flag is set to “ON” when a RFID label is detected in which the label must be folded beforehand, and the operation flag is set to "OFF" when it detects either a normal label or a RFID label in which the label does need not be folded.

As shown in FIG. 8, once the label is conveyed (S30), the reader/writer 13 determines whether or not the label needs to be folded (S31). If folding is necessary (S31 YES), the operation flag is set to "ON" (S32), and if not (S31 NO), the operation flag is set to "OFF" (S33). When the operation flag is "ON" (1) (S34 ON), the air cylinder device 26 (folding means) and the fold assisting means 30 are operated (S35). Thereafter, the transfer means 27 is operated (S36), and the label L is folded to form an angle and applied to the article W.

When the operation flag is "OFF" (0) (S34 OFF), on the other hand, neither the air cylinder device 26 (folding means) nor the fold assisting means 30 is operated, but the transfer means 27 is operated (S36), and the label L is applied flat to the article W.

According to this setting by the reader/writer 13 (*c*), whether the label is a normal label or a label fixed with the RFID tag T is determined by the reader/writer 13 to set the operation flag. Thus, setting by means of the operation portion 88 is no longer performed. By simply loading two types of labels in accordance with use, the presence or absence of the operation of the air cylinder device 26 (folding means) and the fold assisting means 30 are switched automatically, achieving good working efficiency. Moreover, when setting the operation flag in accordance with a type of the label L either one to which the RFID tag T is fixed or a label L without the RFID tag T fixed (whether to apply the label flat or to apply the label after folding it to form an angle), this can be changed according to the type of label to be applied or the information stored in the IC chip inside the RFID tag, whereby the use application is expanded.

According to the above explanation, the portion 2 of the label L to which the RFID tag T is fixed protrudes to form an angle with respect to the label as applied to the article, which separates the RFID tag T from the article, whereby the influence of the article on with the RFID tag T can be reduced, and stable writing and reading can be secured.

Moreover, the back faces of the one side face 3 and the other side face 4 in the folded portion M on the tag are joined to each other by the folding means. Thus, the display layer U and the adhesion layer B of the label L cover the tag-fixing area 1 to form a double structure, whereby the strength of this part can be increased, and the RFID tag T can be prevented from being easily damaged.

Furthermore, by using the label L shown in FIG. 17, after using the article W, the folded portion M that protrudes to form an angle can be easily cut off. Thus, leak of information from the tag can be prevented, and also sorting and disposal can be performed easily.

In addition, by means of the operation flag setting, it is possible to switch the ways of label application between applying the label L flat to the article W and applying the label L after folding it to form an angle, in accordance with a use or the system. It is further possible to visually recognize the content or type of the article W easily according to the form of the applied label L (whether to apply the label L flat or to apply the label L after folding it to form an angle).

Figure 9:
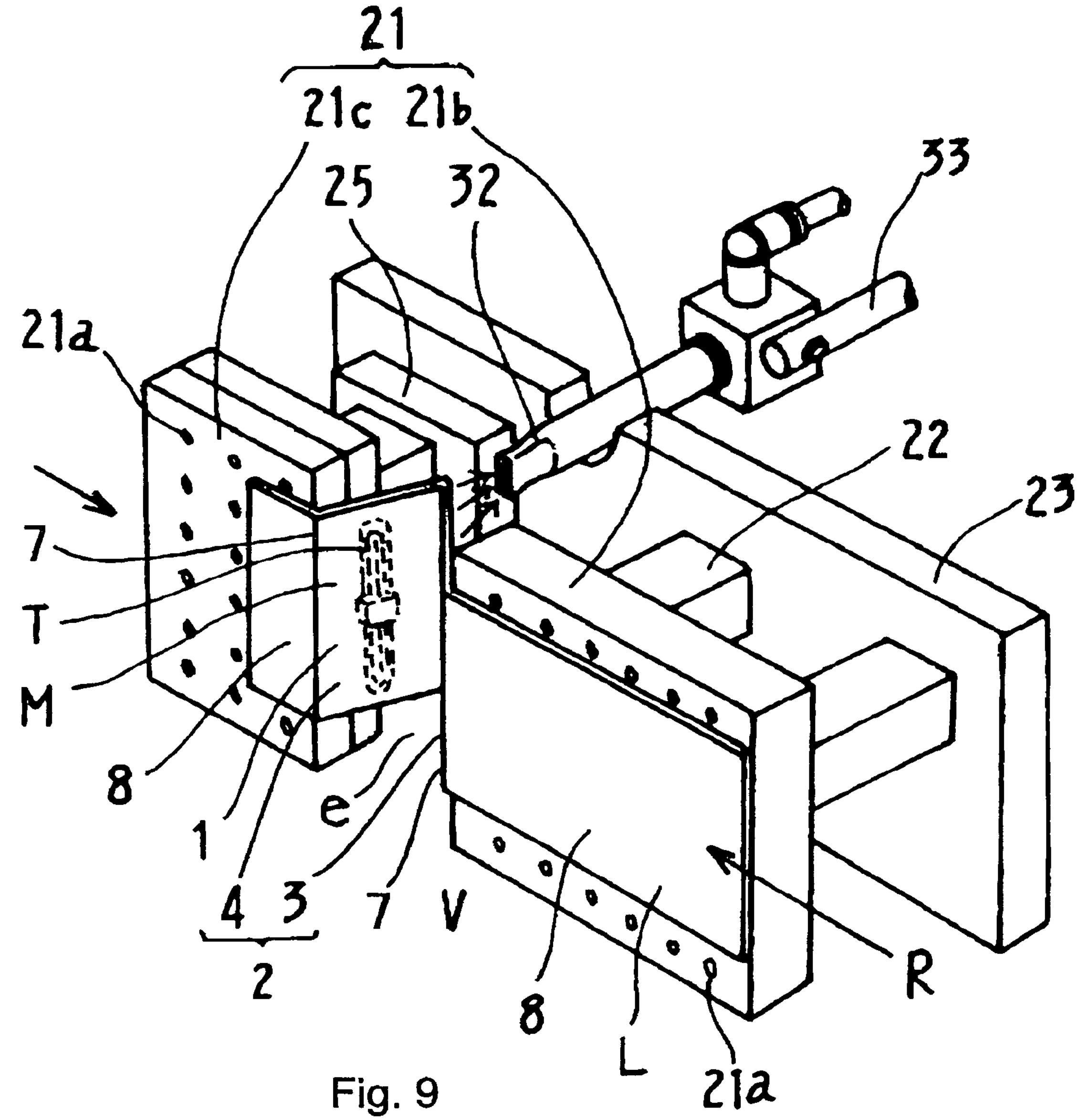
FIG. 9 is a perspective view of a substantial portion, which shows the label application device related to a second embodiment of the present invention.
Figure 10A:
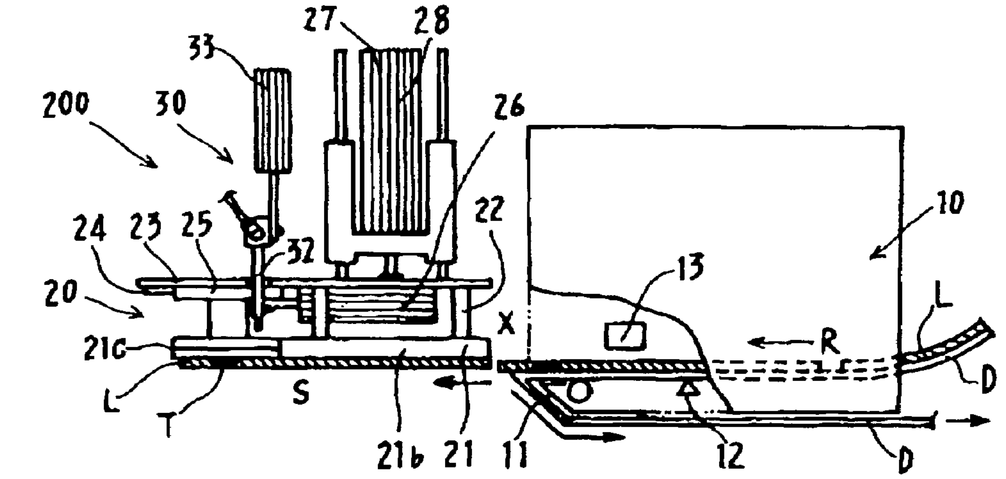
FIG. 10 is a plan view showing the label application device of the second embodiment of the present invention, along with its operation.
Figure 10B:
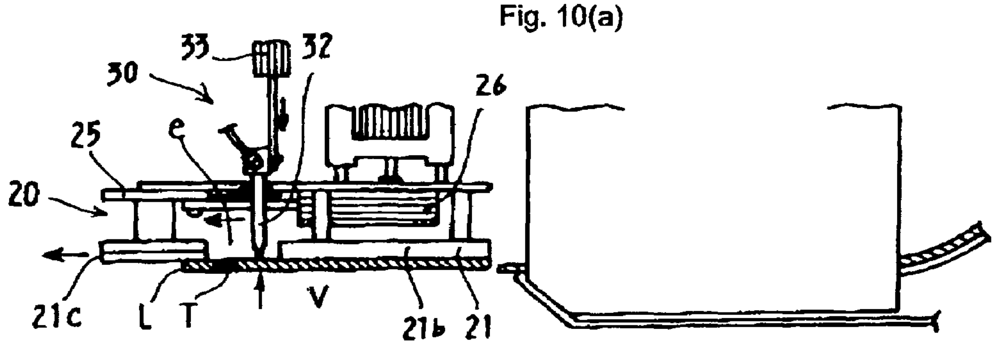
Figure 10C:
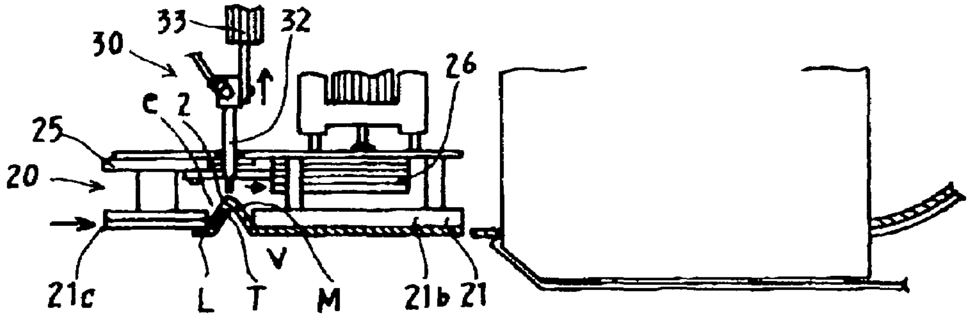
Figure 10D:
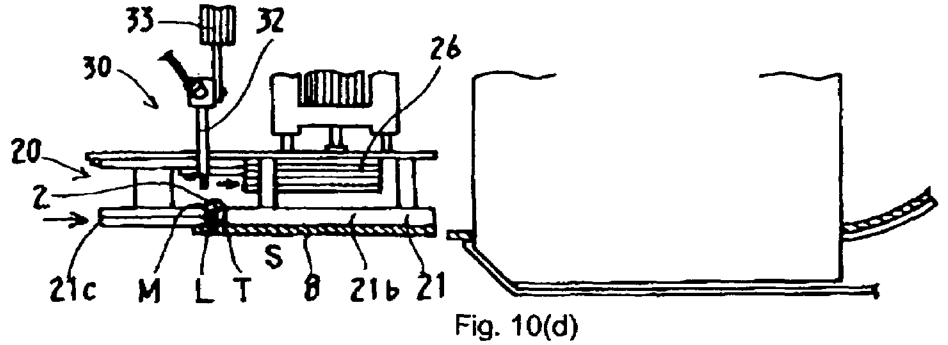
Figure 11:
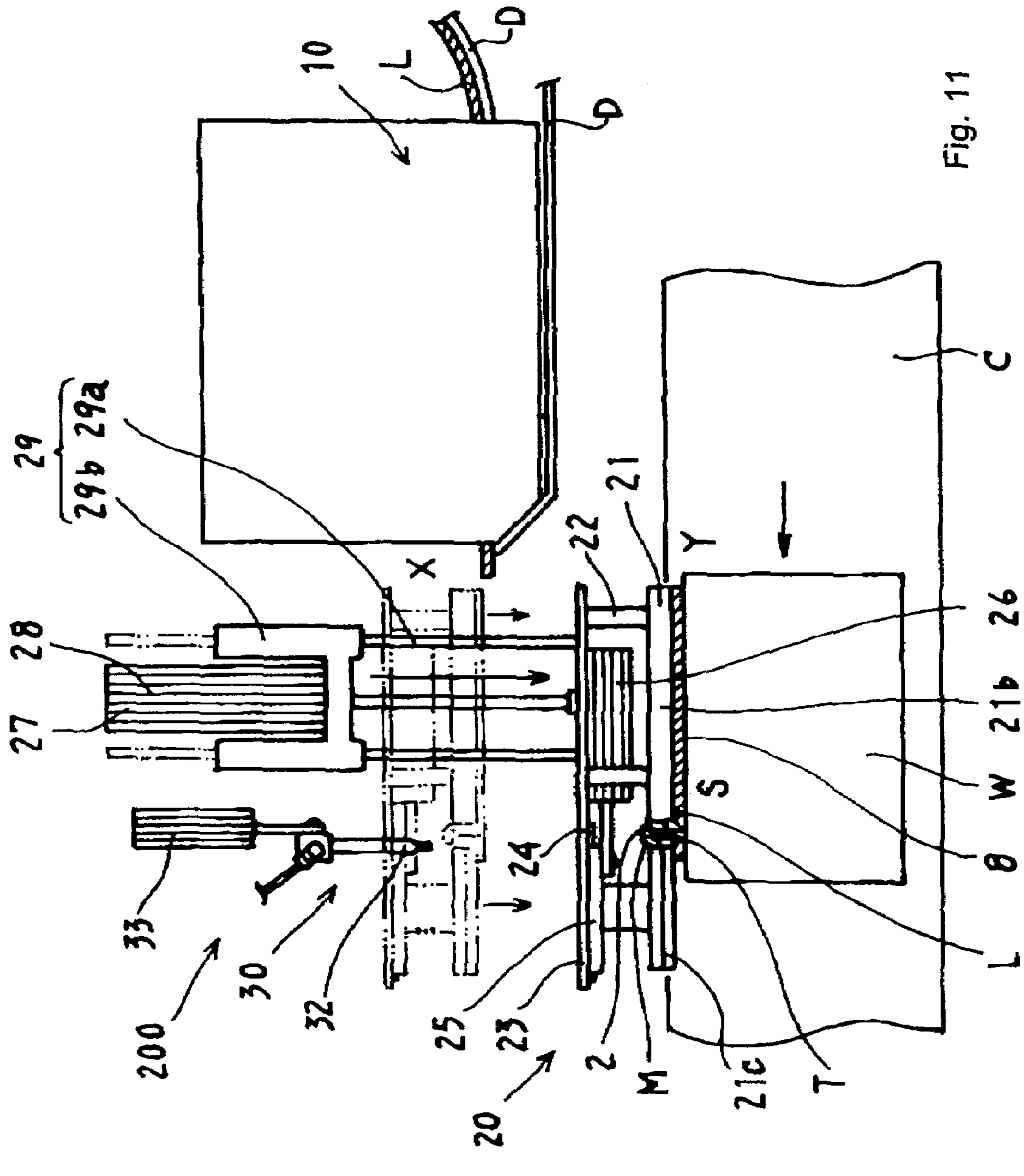
FIG. 11 is a plan view showing the label application device of the second embodiment of the present invention, along with its operation.

FIG. 9 through FIG. 11 show a label application device 200 according to a second embodiment of the present invention. In the label L which is the object of the label application device according to the second invention, as shown in FIG. 4, FIG. 16 and FIG. 17, a portion 2 of the label L having the tag-fixing area 1 is formed in the intermediate or the generally middle portion of the label L.

The label application device 200 is configured the same as the label application device 100 according to the first embodiment, except that the structure of the fold assisting means 30 of the second embodiment differs from that of the label application device 100 of the first embodiment.

The fold assisting means 30 of the label application device 200 comprises a suction nozzle 32 which draws the portion 2 of the label L having the tag-fixing area 1 to which the RFID tag T of the label L is fixed, from the surface side (display layer U) of the portion 2, and folds the portion 2 of the label L toward the surface side.

The suction nozzle 32 is movable by an air cylinder device 33 which comprises a piston on which the suction nozzle 32 is fitted and a cylinder on a machine board (not shown) side. The suction nozzle 32 abuts against or approaches the surface of the portion 2 of the label L when the nozzle is moved forward by the air cylinder device 33, to attract the label L by suction, and, when the nozzle is moved backward by the air cylinder device 33, this folds the portion 2 of the label L, by being pushed at its back side toward its surface side, and protrudes the portion 2 to form a folded portion M. Since the portion 2 of the label L is folded by the suction nozzle 32 and the air cylinder device 26 (folding means), folding can be performed securely.

Therefore, as described hereinafter, the label L is applied by means of the label application device 200 according to the second embodiment. The following explains the situation when an operation flag is "ON" (1). When the operation flag is "OFF" (0), the label is applied flat in a similar fashion described above.

As shown in FIG. 10(*a*), the label L is conveyed by the label conveying means 10, and when the backing paper D is folded by the release plate 11 and the label L is released, the attachment plate 21 attaches the label L in the attachment position X. In this state, as shown in FIG. 10(*b*), the air cylinder device 26 is operated, and the divided body 21*c* is moved to the separation position V. This creates the space e between the divided body 21*b* and the divided body 21*c* into which the portion 2 of the label L, which is caused to protrude by being pushed at its back side toward its surface side, can enter.

Further, as shown in FIG. 10(*b*), the air cylinder device 33 is operated to move the suction nozzle 32 forward to abut against or bring it close to the surface of the portion 2 of the label L, and at the same time the suction nozzle 32 is operated to attach the label L by suction.

Thereafter, as shown in FIG. 9 and FIG. 10(*c*), the air cylinder device 26 is operated, and the divided body 21*c* is transferred from the separation position V to the joining position S. At the same time, the air cylinder device 33 is operated to move the suction nozzle 32 backward. Consequently, while the divided body 21*b* and the divided body 21*c* are respectively attached to and hold both end portions of the label L in the conveyance direction R, the bent portion 7 of the one side face 3 and the bent portion 7 of the other side face 4 are pressed in the direction in which the back face sides of the one side face 3 and other side face 4 approach each other, whereby the folded portion M is formed. In this case, the portion 2 of the label L is pulled by the suction nozzle 32, and the portion 2 of the label L is gradually folded to form an angle securely.

As shown in FIG. 10(*d*), when the divided body 21*c* is transferred from the separation position V to the joining position S, the end faces of the divided body 21*b* and the divided body 21*c* that face each other or are opposed abut respectively against the surfaces of the one side face 3 and the other side face 4 which are in the portion 2 of the label L, to push against these surfaces, joining the back faces of the one side face 3 and the other side face 4 with each other, whereby the folded portion M is formed.

Thereafter, as shown in FIG. 11, the operation of the air cylinder device 33 is stopped, and the air cylinder device 28 of the transfer means 27 is operated to transfer the attachment plate 21 from the attachment position X to the application position Y. Accordingly, the attached label L is applied to the article W. In this case, the application face 8 of the label L is formed on both sides of the folded portion M, which is the portion 2 of the label L that protrudes to form an angle. This face is pressed to the article W by the divided bodies, whereby the label L is securely applied to the article W. After applying the label, the attachment plate 21 returns to the attachment position X.

Therefore, the action and effect of this label application device is the same as the label application device of the first embodiment described above.

Figure 12:
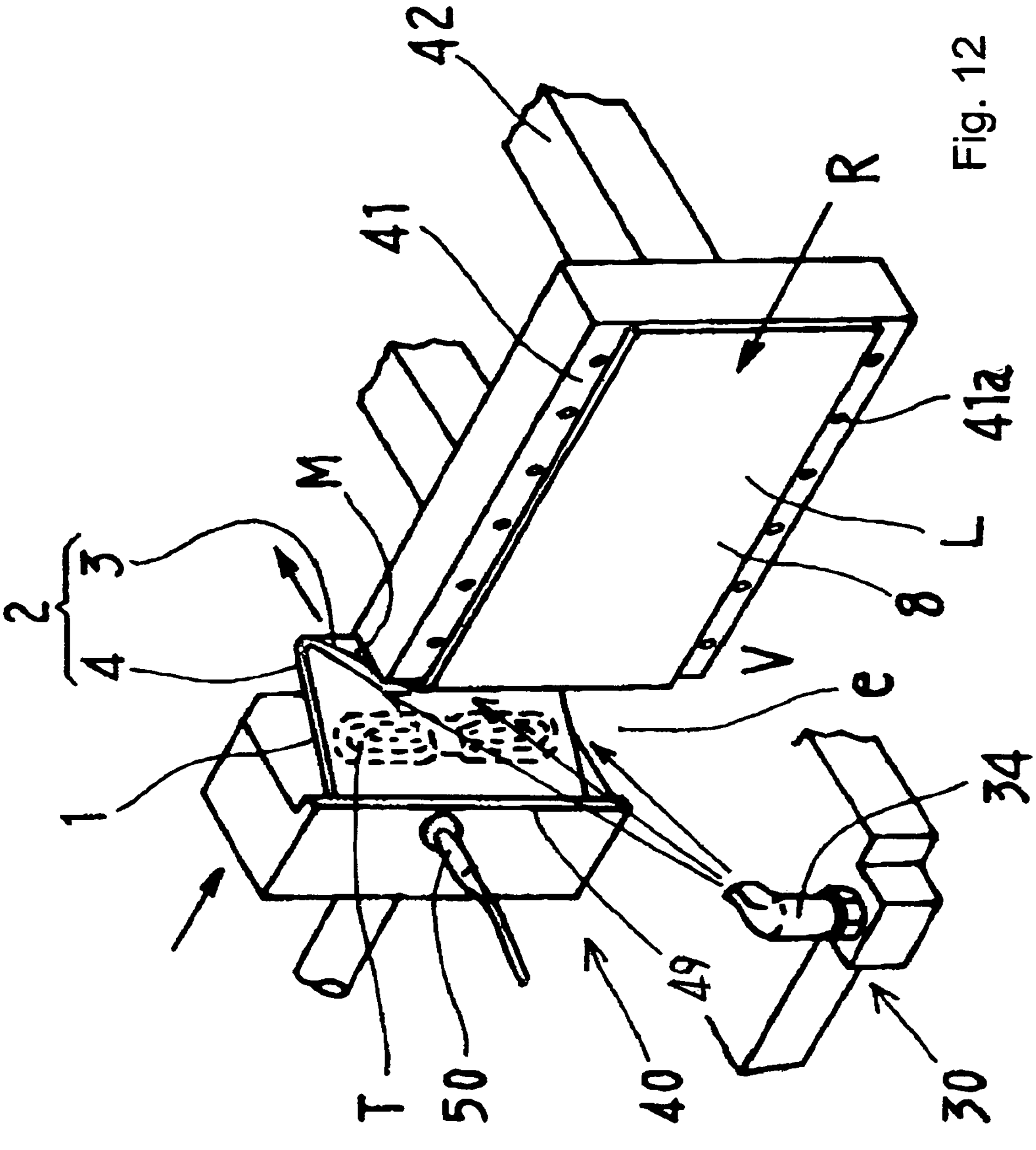
FIG. 12 is a perspective view of a substantial part showing the label application device related to a third embodiment of the present invention.
Figure 13A:
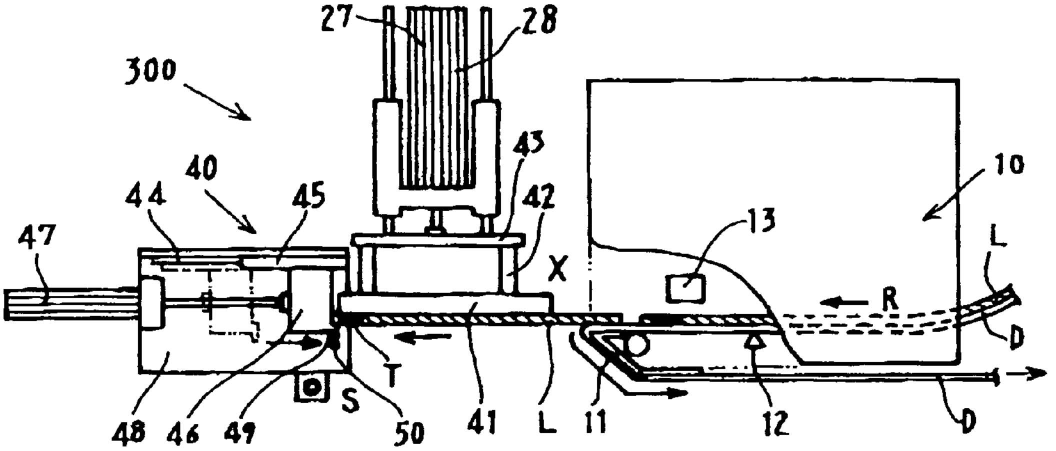
FIG. 13 is a plan view showing the label application device of the third embodiment of the present invention, along with its operation.
Figure 13B:
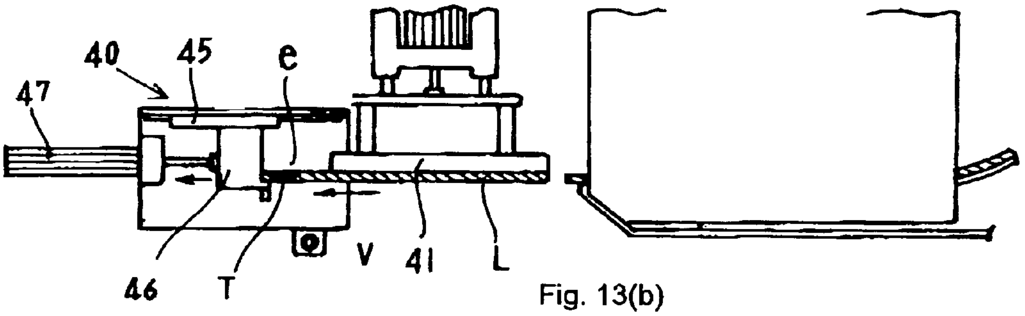
Figure 13C:
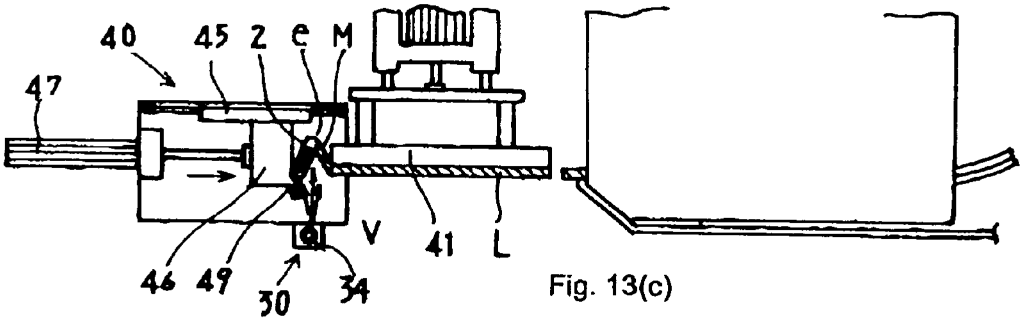
Figure 13D:
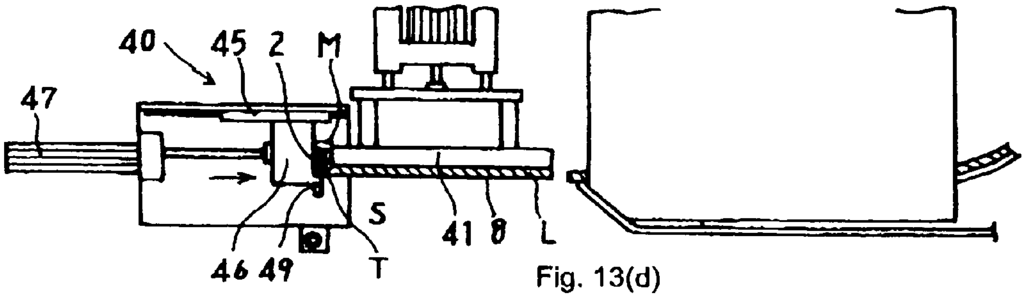
Figure 14:
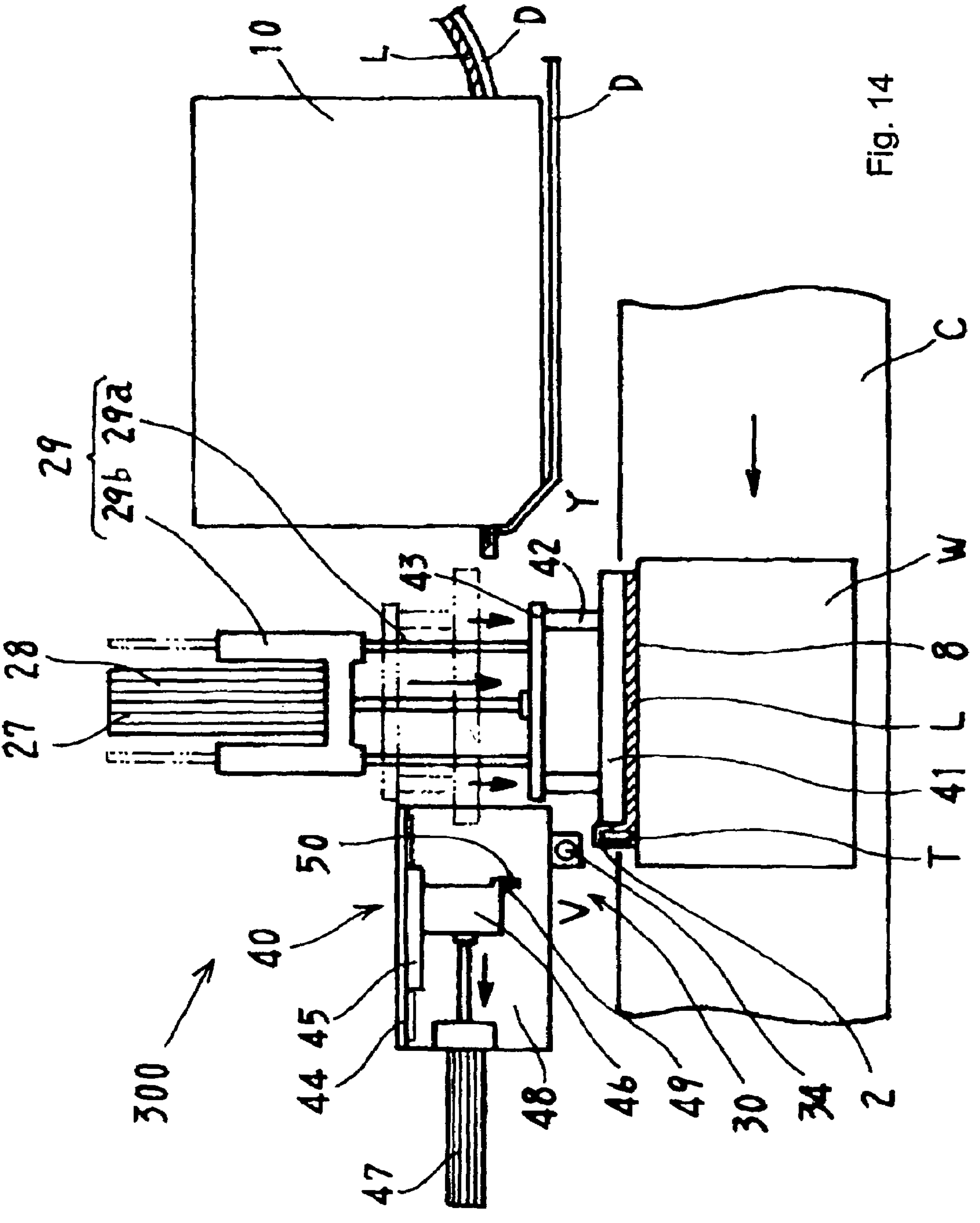
FIG. 14 is a plan view showing the label application device of the third embodiment of the present invention along with its operation.
Figure 15:
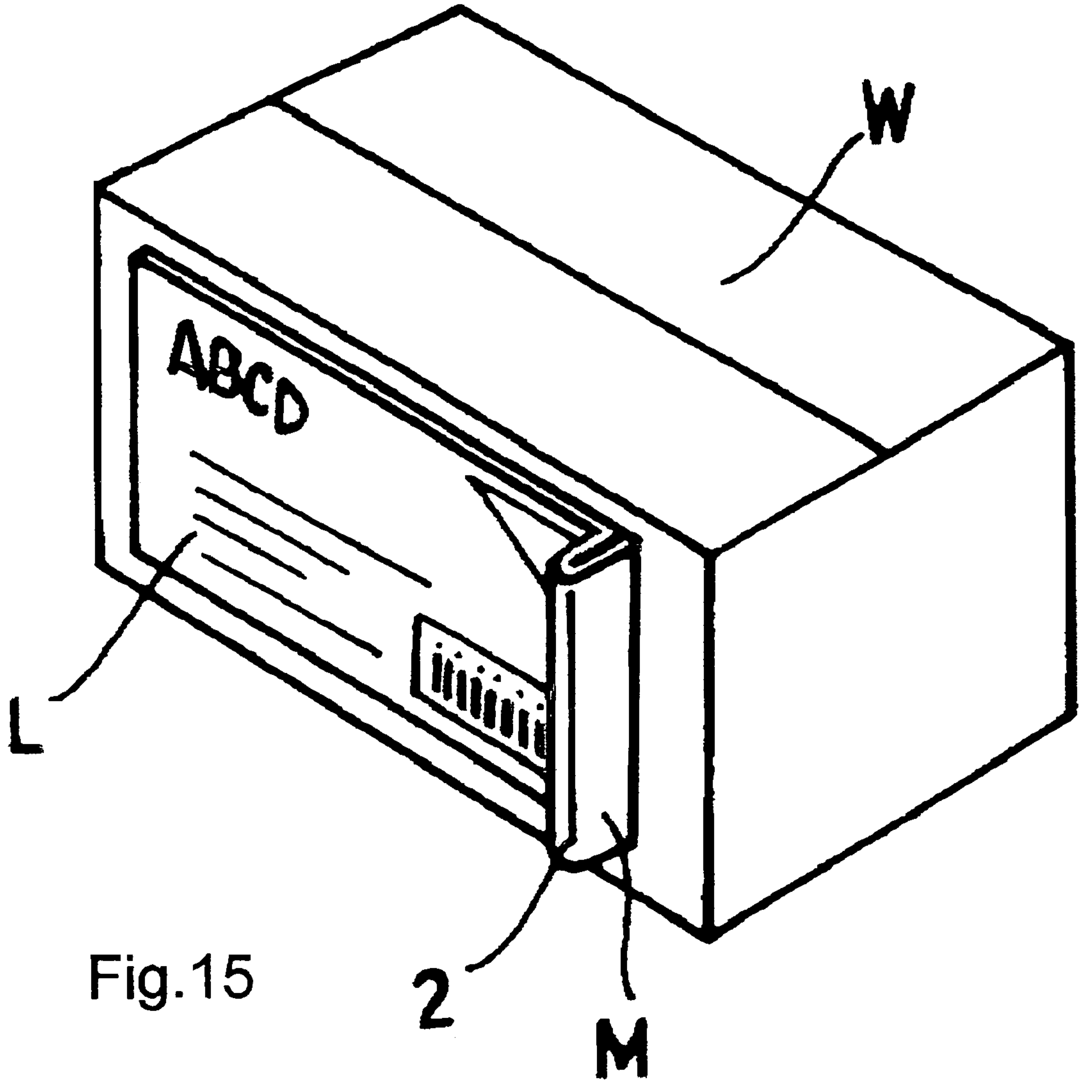
FIG. 15 is a perspective vie showing a state of a label which is applied to an article by the label application device related to the third embodiment of the present invention.

FIG. 12 through FIG. 14 show a label application device according to a third embodiment of the present invention. In a label L which is the object of the label application device according to the third embodiment, as shown in FIG. 15 and FIG. 18, a portion 2 of the label L having a tag-fixing area 1, to which the RFID tag T of the label L is fixed, is formed at an end portion of the label L.

A label application device 300 of the third embodiment is configured in substantially the same way as the label application device 100 of the first embodiment described above, but differs from the label application device 100 of the first embodiment in the configuration of the folding and applying means.

Folding and applying means 40 of the label application device 300 according to the third embodiment has an attachment plate 41 (label holding means), which is not divided like the attachment plate 21 of the label application device 100 of the first embodiment.

Specifically, the attachment plate 41 is to attach the surface side (display layer U side) of the label L such that the portion 2 of the label L having the tag-fixing area 1 to which the RFID tag T of the label L is fixed and which is released by means of the release plate 11 can be caused to protrude by being pushed at its back side (adhesion layer B side) toward its surface side (display layer U side).

The attachment plate 41 of the folding and applying means 40 has a plurality of pores 41*a* which draw the air for attracting the surface of the label L. This attachment plate 41 is supported by a base 43 by means of a supporting member 42.

Further, in the folding and applying means 40, a slider 45 can slide on the rail 44 along the conveyance direction R of the label L. A press member 46 is fixed to the slider 45 and is operable to press the bent portion 7 of the second side face 4 of the label L. An air cylinder device 47 (folding means), in which a piston is fitted on the press member 46, transfers the press member 46 to the separation position V and the joining position S. These are all supported by a supporting body 48.

Further, in the conveyance direction R of the label L, a rear end portion of the press member 46 is provided, in a protruding fashion, with a bearing portion 49 which is contacted by and blocks a front end of the label L in the conveyance direction R. The bearing portion 49 is provided with a sensor 50 which detects the front end of the label L to be conveyed, at the joining position S of the press member 46.

Furthermore, the moving means 27 of the folding and applying means 40 is configured with the air cylinder device 28 like the label application device 100 of the first embodiment. The air cylinder device 28 comprises a piston on which the base 43 is fitted and a cylinder on a machine base (not shown) side, wherein the attachment plate 41 is transferred between two positions, either the attachment position X in which the label L to be released by the release plate 11 is attached, and the application position Y in which the attached label L is applied to the article W.

Moreover, the fold assisting means 30 of the folding and applying means 40 is fixed to the supporting body 48 in substantially the middle where the press member 46 is transferred from the separation position V to the joining position S, and comprises an air blow nozzle 34 which blows air from the back face side (adhesion layer B side) to the portion 2 of the label L, and folds the portion 2 of the label L toward the surface side (display layer U side) to form an angle as caused by the force of the blowing air.

It should be noted that the circuit configuration of the label application device 300 of the third embodiment is the same as the circuit configuration of the label application device 100 of the first embodiment (see FIG. 5), in which the folding and applying means 40 is controlled by the label application control portion 92.

Therefore, as described hereinafter, the label L is applied by means of the label application device 300 according to the third embodiment. This section explains the situation when an operation flag is "ON" (1). When the operation flag is "OFF" (0), the label is applied flat in a similar fashion as described above.

As shown in FIG. 13(*a*), the label L is conveyed by the label conveying means 10, and when the backing paper D is folded by the release plate 11 and then the label L is released, the label L is attached to the attachment plate 41 and conveyed in the conveyance direction R of the label L. Then the label application control portion 92 operates the air cylinder device 47 to transfer the press member 46 from the separation position V to the joining position S. When the front end of the label L reaches the bearing portion 49 of the press member 46, the sensor 50 detects it and outputs a signal to the label application control portion 92. At the same time the label application control portion 92 operates the air cylinder device 47 based on the detection performed by the sensor 50 as shown in FIG. 13(*b*), to transfer the press member 46 from the joining position S to the separation position V, and the attachment plate 41 is used to attach the label L in the attachment position X.

In this state above, as shown in FIG. 13(*b*), the press member 46 is placed to the separation position V, which creates the space e between the attachment plate 41 and the press member 46 into which the portion 2 of the label L, which is caused to protrude by being pushed at its back face side toward its surface side, can enter.

Next, as shown in FIG. 12 and FIG. 13(*c*), the label application control portion 92 operates the air cylinder device 47, and the press member 46 is transferred from the separation position V to the joining position S. At the same time, the label application control portion 92 operates the air blow nozzle 34 to blow air against the back face side (adhesion layer B side) of the portion 2 of the label L having the tag-fixing area 1 to which the RFID tag T of the label L is fixed. Consequently, while the attachment plate 41 attaches and holds the label L, the attachment plate 41 and the press member 46 press the bent portion 7 of the one side face 3 and the bent portion 7 of the other side face 4 in the direction in which the back face sides of the one side face 3 and other side face 4 approach each other and bend the portion 2 of the label L, whereby the folded portion M is formed. In this case, the portion 2 of the label L is folded against the surface side (display layer U side) to form an angle by the force of the blowing air coming from the air blow nozzle 34, whereby the portion 2 of the label L is gradually folded to form an angle.

Then, as shown in FIG. 13(*d*), once the label application control portion 92 operates the air cylinder device 47 to transfer the press member 46 from the separation position V to the joining position S, the end faces of the attachment plate 41 and the press member 46 that face each other are abutted respectively against the surfaces of the one side face 3 and the other side face 4 which are in the portion 2 of the label L, to push these surfaces, and the back faces of the one side face 3 and the other side face 4 are joined with each other.

Thereafter, as shown in FIG. 14, the air cylinder device 47 operates to transfer the press member 46 from the joining position S to the separation position V, and at the same time the label application control portion 92 operates the air cylinder device 28 to transfer the attachment plate 41 from the attachment position X to the application position Y. Consequently, the label L attached to the plate 41 is applied to the article W. When the label L is applied to the article W, the folded portion M, which is the portion 2 of the label L, protrudes to form an angle, and is raised from the article W, as shown in FIG. 15.

Therefore, the action and effect of this label application device is the same as the label application device of the first embodiment described above.

In the above-described embodiment, the fold assisting means 30 is explained using the air blow nozzle for blowing air to the portion 2 of the label from the back side, or the suction nozzle for drawing the portion 2 of the label from the surface side, but it should be noted that no limitation is made to this. Thus, the fold assisting means 30 may be changed accordingly as long as it is used to assist folding such that the portion 2 of the label L fixed with the RFID tag T can be folded in the same direction.

Moreover, the above-described embodiment explains that the back faces of the one side face 3 and the other side face 4, which are in the portion 2 of the label L, are joined with each other, but no limitation is made to this. Thus, the label L may be applied to an article such that the portion 2 of the label L is folded and protruded to form an angle without joining the one side face 3 to the other side face 4. In this case, reduction of the amount of movement from the separation position V to the joining position S can be realized easily in the air cylinder device 26 (first and second embodiments) and the air cylinder device 47 (third embodiment). Accordingly, the portion 2 of the bent label L is folded and protrudes to form an angle. Thus, in the case where the portable reader/writer is held against the IC chip Ta of the label L that was applied to the article W in order to read the data of the chip, the range of communication is expanded, compared to the case in which the label L is applied flat to the article W, whereby efficient reading work in the label L is achieved.

Moreover, when a folding line is provided so that the portion 2 of the label L can be folded to form an angle, the fold assisting means 30 does not have to be provided particularly. However, in order to securely fold the portion 2 of the label L by being pushed at its back face side toward its surface side, it is preferred that the fold assisting means 30 be provided.

The above-described embodiments further explain that the attachment plates 21 and 41 are transferred from the attachment position X to the application position Y by the air cylinder device 28 to press and apply the label L to the article W, but no limitation is made to this. Thus, the embodiments can be applied to a label application device having a system (air jet system) in which the air is discharged from the pores 21*a* and 41*a* of the attachment plates 21 and 41 to apply the label L to the article W by blowing off the label L towards the article W. In this case, after folding the portion 2 of the label L to form an angle by means of the air cylinder device 26 (first and second embodiments) and the air cylinder device 47 (third embodiment), application of the label can be easily realized by discharging air from the pores 21*a* and 41*a* of the attachment plates 21 and 41 by means of the label application control portion 92.

Furthermore, the label application device of the embodiments above can be implemented in an ink jet label application device which prints out the information related to the article W or variable information such as a bar code on the surface side (display layer U side) of the label L, of a label application device which comprises printing means having a head such as a thermal head.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A label application device operable for applying a label to an article, wherein the label has opposite sides including a surface side and a back side, the label application device comprising:

a label holding device for holding the surface side of the label to the holding device, the label holding device comprises a body divided into first and second body parts, at least one of the first and second body parts being configured for holding the label to at least one of the first and second body parts, the body parts having opposing sides facing each other;

a moving device connected with at least one of the body parts and operable for moving the at least one of the body parts to define a separated position of the body parts at which the opposing sides thereof are separated and a joining position of the body parts at which their opposing sides are moved toward abutting;

the holding device holding the label such that the portion of the label is held to extend across a gap defined between the opposing sides of the body parts in the separated position thereof and such that movement of the at least one body part toward the joining position is operable to fold the portion of the label between the opposing sides of the body parts and is operable to push the folded portion of the label toward the surface side thereof, such that first and second side faces of the back surface of the label at the label portion are defined as the label portion is folded and the first and second side faces at the back side at the label portion are pushed toward abutting and also thereby define an apex between the first and the second side faces and also define bent portions of the label at the divided body parts, thereby forming the folded portion of the label;

a label folding device for folding a portion of the label, the portion being along a length direction of the label, while the label is being held by the label holding device, the folding being such that the back side of the label at the label portion is urged toward the surface side of the label so that the label portion protrudes to form an oblique angle across the length direction of the label; and a label applying device configured and operable on the label with the folded portion for applying the label to an article.

2. The label application device of claim 1, further comprising a press member operable to fold the portion of the label and to press a bent portion side of a side face of the label and fold the label with the first and the second side faces of the back side of the label formed by the folding, the folding device is operable to transfer the press member between a separated position and a joining position;

the press member and the label holding device being operable to bend the portion of the label by pressing the bent portion of the one side face and the bent portion of the other side face in a direction in which the back side faces of the one side face and the other side face of the label approach each other, thereby forming the folded portion.

3. The label application device of claim 1, wherein the folding device comprises a fold assisting device for assisting folding of the portion of the label by the assisting device being operable for moving the back side of the label toward the surface side of the label to form the angle in the label portion.

4. The label application device of claim 3, wherein the fold assisting device comprises an air blow nozzle configured and operable to blow air onto the back side of the label at the label portion whereby the assisting device is operable to fold the portion of the label toward the surface side by force of blowing air.

5. The label application device of claim 3, wherein the assisting device comprises a suction nozzle positioned to be configured and operable to draw the label portion from the surface side of the label portion, thereby folding the fold in the label portion.

6. The label application device of claim 3, further comprising a fold control device operable for driving the folding device and for controlling whether the folding device folds the portion of the label such that the back side of the label is pushed toward the surface side of the label and such that the label portion is folded to form the angle.

7. The label application device of claim 6, further comprising:

a setting device for setting whether the fold control device will cause the folding device to fold the portion of the label such that the back side of the label is pushed toward the surface side of the label to form the fold and to form an angle in the label portion;

a storage for storing a set value set by the setting device;

a judging device for judging the set value stored in the storage, wherein the fold control device drives the folding device to fold the portion of the label such that the back side of the label is pushed toward the surface side of the label at the label portion so that the label portion is folded to form the angle, when the judging device judges the set value and judges the setting of folding the label portion such that the back side of the label is pushed to the surface side of the label so that the label portion is folded to form the angle.

8. The label application device of claim 7, further comprising an operation portion operable to set information related to operation of the label application device, and the setting device is connected and operable to be set by the operation portion.

9. The application device of claim 7, further comprising an external interface operable to perform wire communication or wireless communication with external equipment; and the setting device is operable to be set by data which is received by the external interface from the external equipment.

10. The application device of claim 7, wherein the label portion has a RFID tag thereon, and the tag includes an IC chip;

the label operating device further comprising:

a reader/writer which rewrites data to the IC chip of the RFID tag; and the setting device is operable to perform setting based on the presence or absence of a response obtained when the reader/writer performs communication with the IC chip.

11. The label application device of claim 1, wherein the folding device comprises a transfer device for transferring the label holding device between an attachment position at which the label holding device attaches to the label and an application position of the holding device in which the label is applied to the article.

12. The label application device according to claim 1, wherein the label holding device comprises an attachment plate operable to attach the label the attachment plate.

13. In combination, the label application device of claim 1 and a label having a surface side, an opposite back side, ends of the label in a length direction and a label portion intermediate the ends of the label;

a RFID tag on the label portion, the RFID tag being shaped and sized such that upon the label being folded by the label folding device, the RFID tag is on the folded portion of the label and generally off the article to which the label is applied.

14. The combination of claim 13, wherein the RFID tag comprises an IC chip and a communication antenna.

15. The combination of claim 13, wherein the RFID tag is positioned at the back face of the label at one of the first and the second side faces thereof such that with the divided body parts moved toward the joining position, the RFID tag is enclosed between the first and second side faces of the back face in the folded portion and off the article to which the label is applied.

16. The label application device of claim 1, wherein each of the first and second body parts is operable to hold the label to itself.

17. The label application device of claim 1, wherein the one of the first and second body parts configured for holding the label to itself further comprises a plurality of pores through which air can be drawn for holding the label against itself.

18. A method of applying a label to an article, wherein the label includes a surface side and an opposite back side and the label is foldable across a length direction thereof to define a folded portion thereof, the method comprising:

supporting the label at the surface side thereof between first and second divided body parts which are separated from each other along the length direction of the label, wherein the divided body parts have opposing sides facing each other, and wherein the label is supported between the divided body parts over a gap between the opposing sides thereof and the label including the label portion extending over the gap between the divided body parts;

moving the divided body parts from a separated position thereof toward a joining position thereof with the opposing sides thereof moving together for folding the label across the length direction as the divided body parts move to the joining position and for folding the label such that the back side thereof moves toward the surface side;

and with the label portion folded, applying the label to an article and off the divided body parts, such that the label on the article has a folded portion thereof.

19. The method of claim 18, further comprising prior to the folding of the label portion, applying a RFID tag to the label portion at such location that upon the folding of the label portion, the RFID tag is moved to a position that the tag will be off the article to which the back side of the label is applied.

20. The method of claim 18, further comprising, while moving the divided body parts toward the joining position, assisting the label portion to move to the folded condition by urging the label portion to move to that condition.

21. The method of claim 20, wherein the assisting of the folding of the label comprises blowing air toward the back side of the label.

22. The method of claim 21, wherein the assisting of the folding of the label comprises sucking at the surface side of the label portion.

* * * * *